United States Patent
Makwinski et al.

(10) Patent No.: US 7,544,900 B2
(45) Date of Patent: Jun. 9, 2009

(54) MODULAR RACEWAY WITH BASE AND INTEGRAL DIVIDER

(75) Inventors: Mark Makwinski, Cromwell, CT (US); Richard R. Picard, West Hartford, CT (US); Jeffery Hemingway, Farmington, CT (US); Shawn Stempinski, Wethersfield, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 12/129,793

(22) Filed: May 30, 2008

(65) Prior Publication Data

US 2008/0283291 A1 Nov. 20, 2008

Related U.S. Application Data

(63) Continuation of application No. 11/844,697, filed on Aug. 24, 2007, now Pat. No. 7,456,366, which is a continuation of application No. 11/035,477, filed on Jan. 13, 2005, now Pat. No. 7,262,371.

(51) Int. Cl.
*H02G 3/08* (2006.01)
(52) U.S. Cl. .............. 174/481; 174/480; 174/72 A; 174/68.1; 174/68.3; 52/220.7; 439/211; 439/207
(58) Field of Classification Search ............ 174/480, 174/481, 72 A, 68.1, 68.3, 101, 95, 97, 99 R, 174/135, 72 R; 439/207, 209–212, 215, 439/216; 52/220.1, 220.3, 220.7
See application file for complete search history.

(56) References Cited

U.S. PATENT DOCUMENTS

| 594,998 | A | 12/1897 | Lyle |
|---|---|---|---|
| D130,827 | S | 12/1941 | O'Brien |
| 2,267,080 | A | 12/1941 | Clayton |
| 2,312,580 | A | 2/1943 | O'Brien |
| 2,313,452 | A | 3/1943 | O'Brien |
| 2,899,668 | A | 8/1959 | Gribben |
| 3,003,132 | A | 10/1961 | Johnson et al. |
| 3,059,204 | A | 10/1962 | Johnson |

(Continued)

FOREIGN PATENT DOCUMENTS

DE 3925010 A1 1/1991

(Continued)

*Primary Examiner*—Dhiru R Patel
(74) *Attorney, Agent, or Firm*—McCormick, Paulding & Huber LLP

(57) ABSTRACT

Raceway modules of predetermined length are joined by couplers designed to allow optional gaps between the T-shaped raceway base plate portions. Upper and lower L-shaped raceway covers are separately snapped out the base, allowing electrical and data/communication devices to be provided in staggered relationship, and anywhere along the raceway. The lower L-shaped raceway cover configuration allows outlet devices to be provided in the lower side of the raceway. The T-shaped base plate has pre-punched knock-out openings and mounting holes provided in a predetermined pattern, and pre-punched lines of weakening, that simplify the installation process. The couplers come in several lengths and configurations, to bridge crossing raceway or other obstructions, and to provide continuity in the gaps between the raceway modules. Pre-wired cover components are fitted with spaced outlet devices for installation in areas of a room that require such service.

5 Claims, 25 Drawing Sheets

U.S. PATENT DOCUMENTS

| | | | |
|---|---|---|---|
| 3,239,795 A | 3/1966 | Verrone | |
| 3,273,103 A | 9/1966 | Ericson | |
| 3,806,858 A | 4/1974 | Larsile | |
| D231,896 S | 6/1974 | Zerwes | |
| D233,729 S | 11/1974 | DeForrest | |
| 4,108,523 A | 8/1978 | Bolis | |
| D258,766 S | 3/1981 | Gold | |
| 4,308,418 A * | 12/1981 | Van Kuik et al. | 174/495 |
| D273,084 S | 3/1984 | Henkel | |
| 4,775,328 A | 10/1988 | McCarthy | |
| 4,814,941 A | 3/1989 | Speet et al. | |
| 4,874,322 A | 10/1989 | Dola et al. | |
| 4,875,871 A | 10/1989 | Booty et al. | |
| 4,952,163 A * | 8/1990 | Dola et al. | 439/211 |
| 4,952,164 A | 8/1990 | Weber et al. | |
| D310,320 S | 9/1990 | Domian | |
| D318,738 S | 7/1991 | Clodfelter, Sr. | |
| D321,863 S | 11/1991 | Henneberger | |
| D327,874 S | 7/1992 | Henneberger | |
| 5,160,174 A | 11/1992 | Thompson | |
| 5,183,406 A | 2/1993 | Glen | |
| D334,380 S | 3/1993 | Henneberger | |
| 5,236,370 A | 8/1993 | King et al. | |
| 5,336,849 A * | 8/1994 | Whitney | 174/72 C |
| 5,469,893 A | 11/1995 | Caveney et al. | |
| 5,595,495 A | 1/1997 | Johnson et al. | |
| 5,614,695 A * | 3/1997 | Benito Navazo | 174/480 |
| 5,629,496 A * | 5/1997 | Navazo | 174/480 |
| 5,861,576 A | 1/1999 | Langston et al. | |
| D413,306 S | 8/1999 | Scherer et al. | |
| 5,942,724 A * | 8/1999 | Russo et al. | 174/481 |
| 6,180,878 B1 | 1/2001 | Gretz | |
| 6,220,880 B1 | 4/2001 | Lee et al. | |
| 6,259,020 B1 | 7/2001 | Ashline et al. | |
| 6,284,975 B1 | 9/2001 | McCord et al. | |
| 6,323,421 B1 | 11/2001 | Pawson et al. | |
| 6,335,484 B1 | 1/2002 | Jarry et al. | |
| 6,342,675 B1 | 1/2002 | DeBartolo et al. | |
| 6,355,880 B1 | 3/2002 | Bateson et al. | |
| 6,362,420 B1 | 3/2002 | Bacouelle et al. | |
| 6,380,486 B1 | 4/2002 | Hemingway et al. | |
| 6,384,336 B1 | 5/2002 | VanderVelde et al. | |
| 6,437,247 B1 | 8/2002 | Holliday | |
| D471,878 S | 3/2003 | Dyer et al. | |
| 6,644,988 B2 | 11/2003 | Healy | |
| 6,646,203 B1 | 11/2003 | Liao | |
| D483,333 S | 12/2003 | Gresham et al. | |
| D484,469 S | 12/2003 | Thibault | |
| 6,664,467 B1 | 12/2003 | de la Borbolla et al. | |
| D486,130 S | 2/2004 | Thibault | |
| 6,727,434 B2 * | 4/2004 | Jadaud et al. | 174/135 |
| 6,756,544 B2 | 6/2004 | Handler | |
| 6,768,050 B2 | 7/2004 | Lockard | |
| 6,890,219 B1 | 5/2005 | Mayer et al. | |
| 6,936,766 B1 | 8/2005 | Galasso | |
| 7,009,108 B2 | 3/2006 | Vargas et al. | |
| 7,045,707 B1 | 5/2006 | Galasso | |
| 7,075,010 B2 | 7/2006 | Santelli, Jr. | |
| 7,111,873 B1 | 9/2006 | Coogle | |
| D539,231 S | 3/2007 | Stempinski | |
| 7,193,159 B2 | 3/2007 | Makwinski et al. | |
| 7,262,371 B2 | 8/2007 | Makwinski et al. | |
| 7,332,675 B2 | 2/2008 | Galasso | |
| 2005/0221646 A1 | 10/2005 | Evilsizer | |
| 2006/0117684 A1 | 6/2006 | Picard et al. | |
| 2006/0151209 A1 | 7/2006 | Makwinski et al. | |

FOREIGN PATENT DOCUMENTS

| | | |
|---|---|---|
| GB | 2420916 A | 6/2006 |
| JP | 2005229775 | 8/2005 |

* cited by examiner

MODULAR RACEWAY WITH BASE AND INTEGRAL DIVIDER

CROSS-REFERENCE TO RELATED APPLICATION

This application is a continuation of prior U.S. application Ser. No. 11/844,697, filed Aug. 24, 2007, which was a continuation of U.S. Pat. No. 7,262,371. The contents of said application and said patent are incorporated by reference herein.

FIELD OF THE INVENTION

The present invention relates to conduit or raceways for electrical cabling.

BACKGROUND OF THE INVENTION

In certain types of building construction, e.g., retrofits, cinder block, or the like, it may not be possible or practicable to run electrical cabling (such as high voltage power lines and low voltage data lines) through the building's walls. In such cases, modular raceway or conduit assemblies are often used to house and route cabling along a wall or other surface. A typical raceway assembly includes a linear or elongate housing having at least one interior passageway that accommodates a length of electrical cabling. (Such a passageway is referred to herein as a "wireway.") The housing is attached to a wall, and then the cabling is disposed in the interior of the housing. To cover a given span, multiple segments of housing are deployed in an end-on-end manner.

In a typical raceway or conduit installation, sections of conduit must be cut precisely to match the wall span to be crossed by the raceway. Such cutting operations, e.g., through sheet metal, are time consuming for installers. Additionally, because the sections are custom cut, it is difficult to adjust or compensate for variations in spacing that stem from adding junction boxes, retrofit outlets, and the like.

SUMMARY OF THE INVENTION

An embodiment of the present invention relates generally to a modular raceway system having raceway base components of predetermined length designed to be mounted to a wall structure, or to be received by wall brackets provided at predetermined intervals along a wall structure. Raceway wall brackets and/or couplers at the adjacent end portions of the raceway base components are designed to take advantage of the unique cross section of the raceway base and provide a continuous enclosed structure for the power and/or data cabling in divided, or separated wireways, defined in part by an integrally formed divider in the base.

In another embodiment, the raceway base is provided with uniformly spaced lines of weakening. Preassembly of the raceway base and associated covers allows for modular use at installation, and also allows for fitting of the raceway to internal wall structures of a building without the need for custom cutting of the raceway base, such as now required with raceway systems of the type available from The Wiremold Company of West Hartford, Conn. under its "3000" or "4000" two piece metal raceway designations.

In another embodiment, the raceway base component is T-shaped. Separate raceway covers are provided for each of the two wireways defined in part by the T-shaped base component. The cover components are generally L-shape in cross section and have end portions designed to mate with the forward or leading edge of the integrally formed divider defined in the base, and to mate as well with the longitudinally extending marginal upper and lower edges of the base. Upper and lower cover components are mounted to the base, and offer flexibility in the placement of power and data/ communication outlet devices in one or the other or in both of these cover components.

BRIEF DESCRIPTION OF THE DRAWINGS

FIG. 3 also illustrates in exploded relationship the geometry of device brackets and device bracket "covers" such as are suitable for use in a raceway of the type disclosed herein.

FIG. 17 is a vertical section through an assembled base 220 and cover pair 260 and 280, with a pair of raceway couplers 250, 250 snapped into the raceway base for holding adjacent base members in alignment. Note the openings 250a, 250a for receiving screw fasteners S, S. Covers 260 and 280 cooperate with the T-shaped base 220 to define separate wireways for the power and data/communication cables.

FIG. 17a shows a preferred one-piece raceway base construction 220a.

DETAILED DESCRIPTION

Turning now to the drawings in greater detail, a wall structure is indicated generally at W1 and W2, defining an internal corner as shown, to represent the environment where a raceway of the present invention can be provided. See, for example, FIGS. 5 and 6, where both internal and external corners are illustrated, and where dropdown raceway segments are provided for bringing electrical cables to the raceway.

Figure 1:
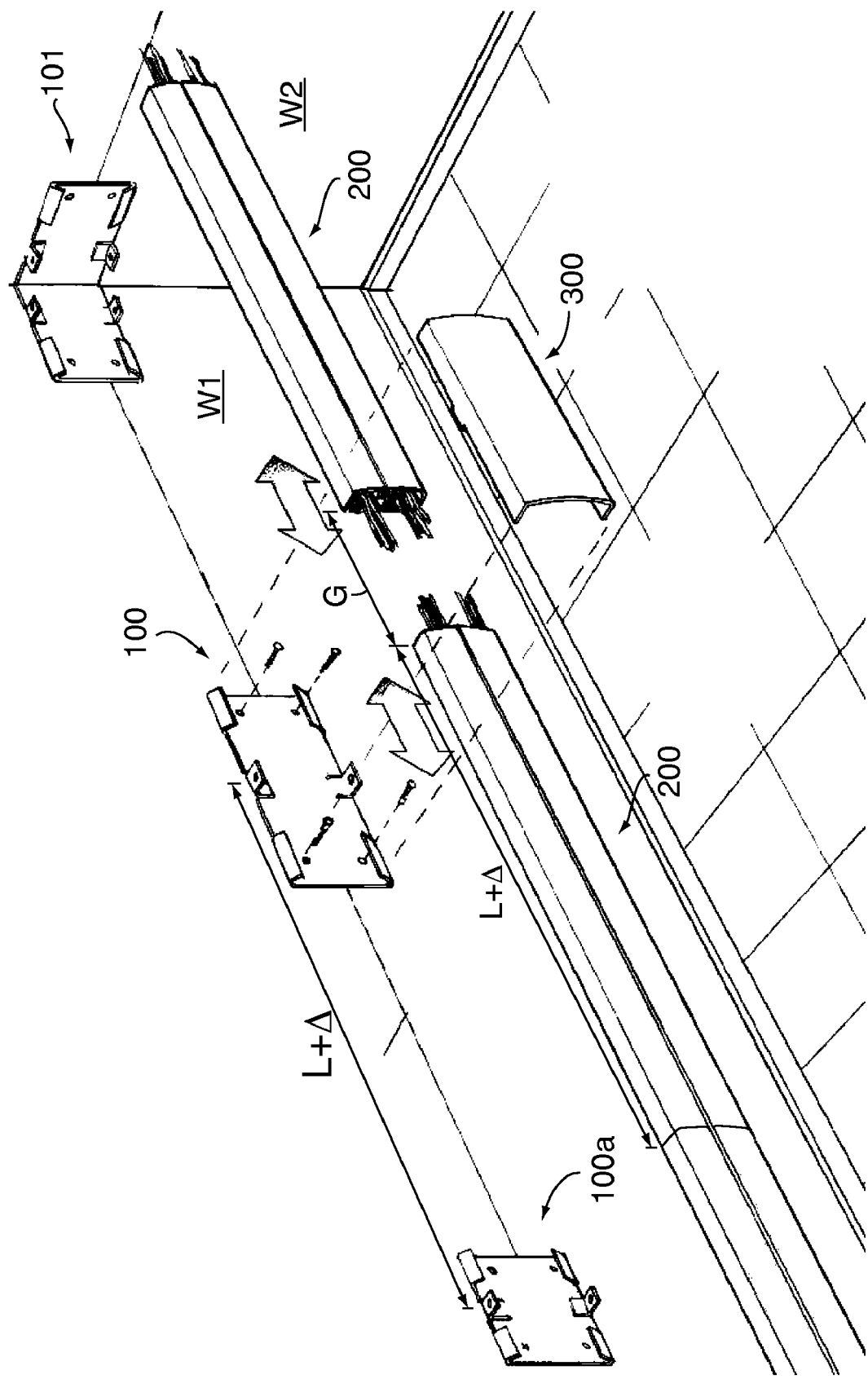
FIG. 1 is an exploded perspective view showing the various components of a first embodiment of the present invention relative to a wall structure.

With reference to FIG. 1, in accordance with the first embodiment of the present invention, a modular raceway is provided, and includes standard-length raceway sections of length "L" that can be secured to the walls W1 or W2, by wall brackets as indicated at 100, 100a. Corner brackets can be fabricated from these unique wall brackets 100, as indicated at 101. Thus, the corner bracket 101 may comprise individual brackets fabricated from the wall brackets 100, 100a, to form a corner bracket 101. It will also be apparent that this same approach can be used to form a corner bracket that can be utilized at an external corner.

Figure 3:
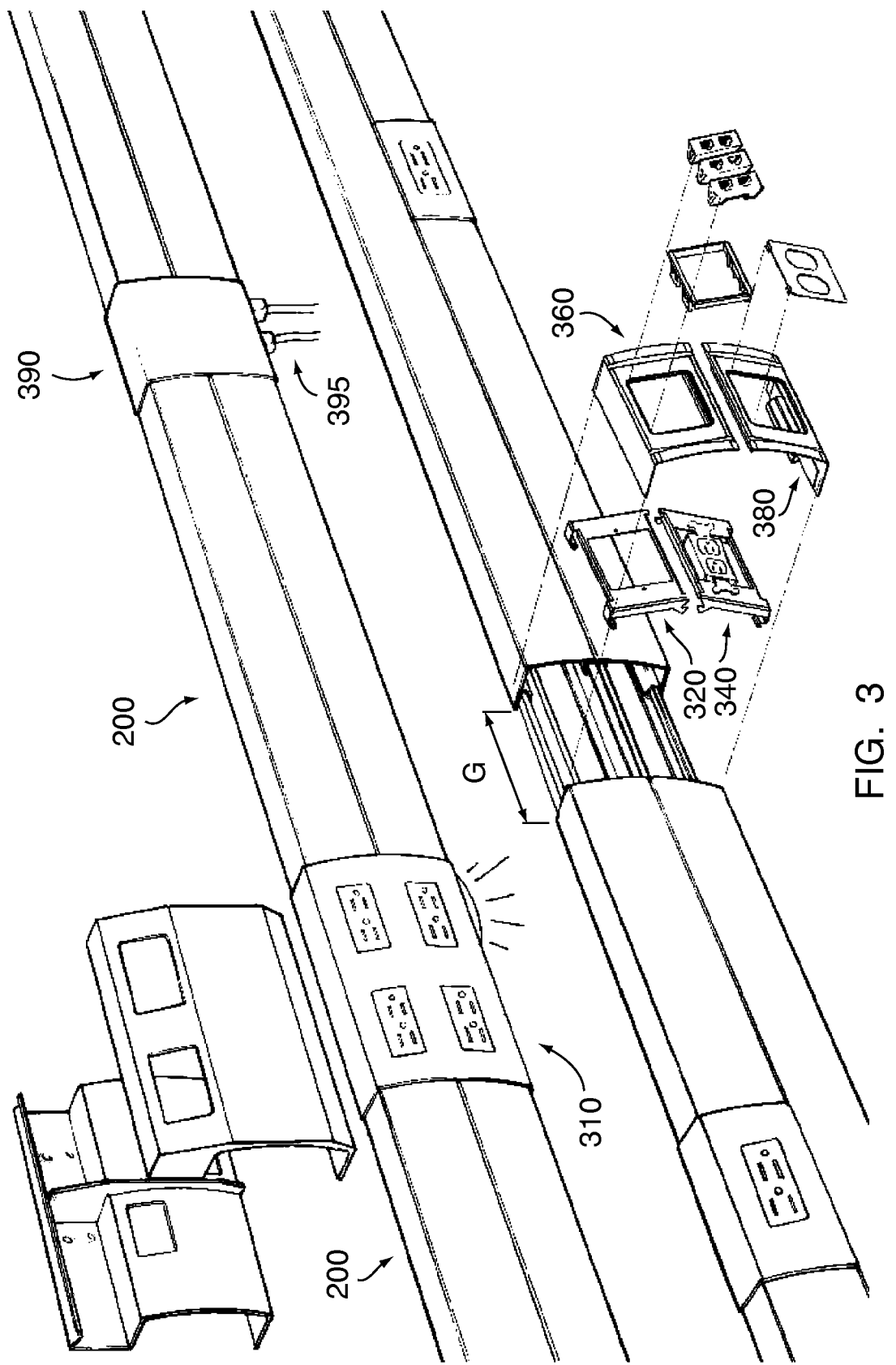
FIG. 3 illustrates the raceway components of the present invention taking advantage of the downwardly open receptacles in the lower raceway, as well as the staggered mounting for outlet devices in the upper and lower raceway covers. Also shown in FIG. 3 is an alternative arrangement where the outlet devices are clustered at a single location in the raceway. This alternative embodiment illustrates a raised device box to provide additional through-put for the cabling in the wireways defined by the raceway base and cover in accordance with the present invention.
Figure 5:
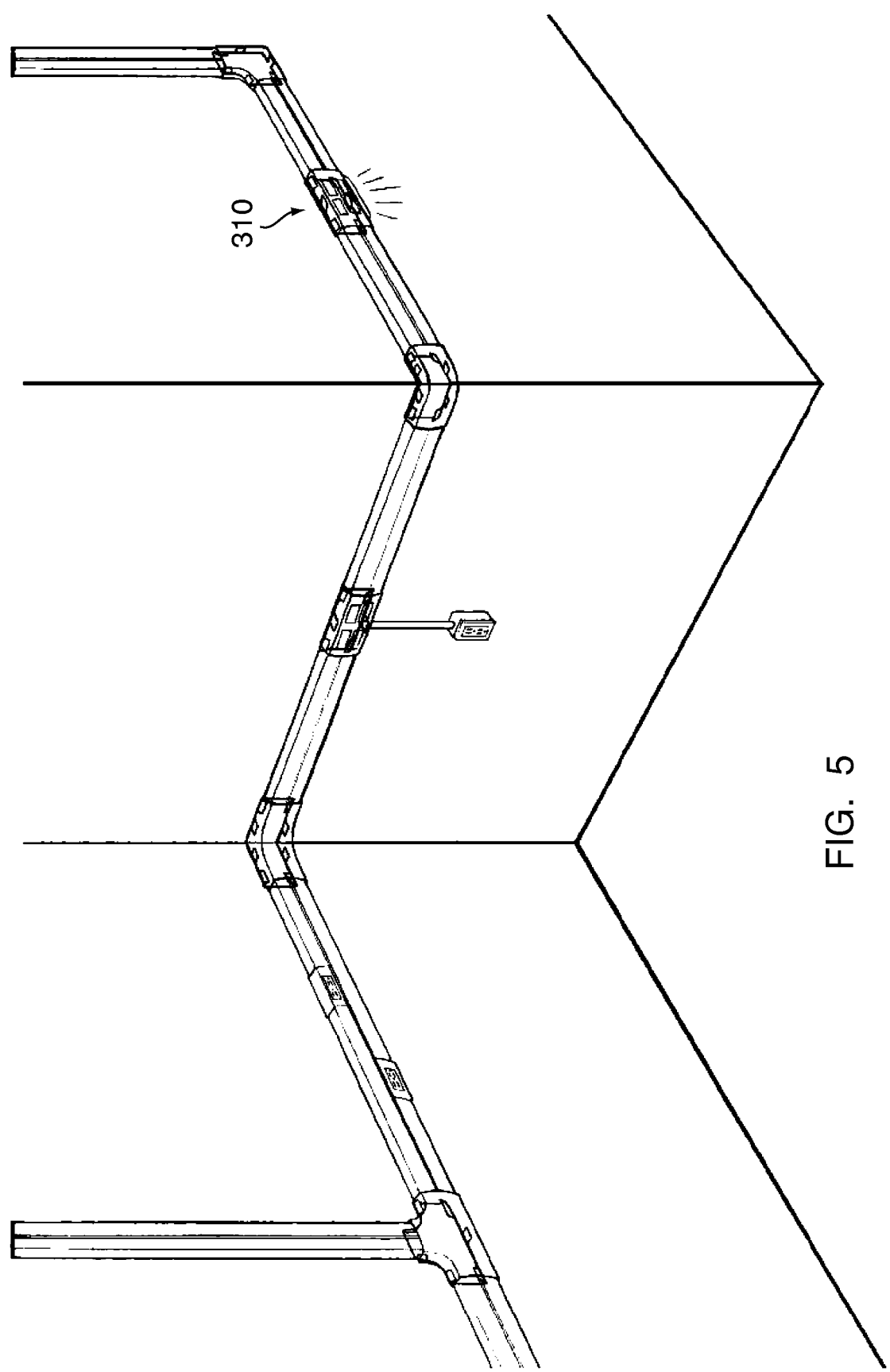
FIG. 5 is an assembly view illustrating the use of modular raceway in accordance with the present invention in a particular installation and illustrates the various internal and external elbows, T-shapes, and flat elbow configurations necessary to provide a complete installation in a particular building environment.
Figure 6:
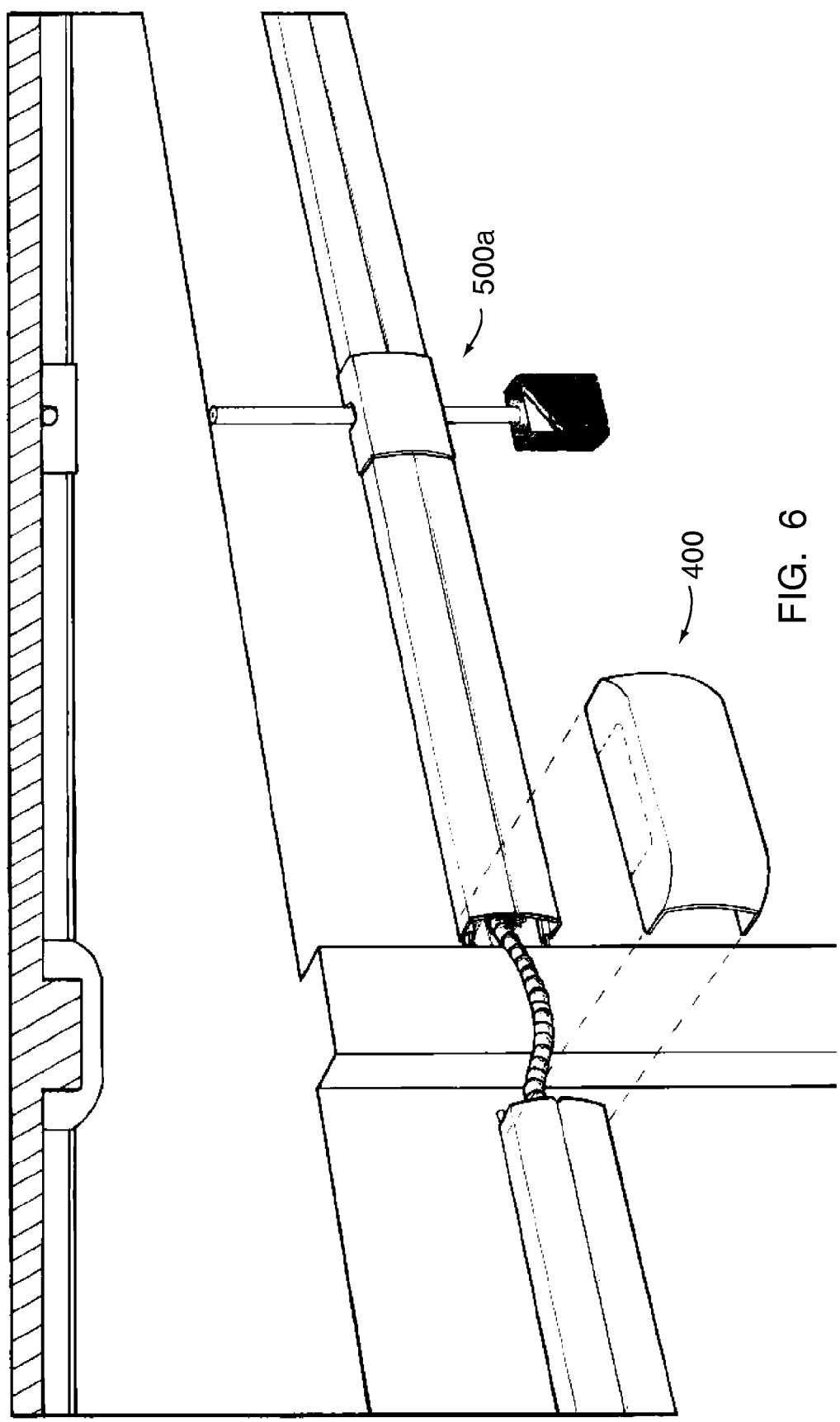
FIG. 6 shows another alternative installation for running raceway of the present invention around an obstacle or column, and/or around an existing conduit or other smaller obstacle in the path of the raceway.

A feature of the present invention is that the raceway assemblies 200, 200 are of standard length (L), preferably between 4-8 feet, and are pre-wired. Thus, the raceway assemblies 200 can be assembled with the mounting brackets 100, 100a so as to leave a gap "G" between the end portions thereof. The internal wiring for each raceway assembly can be filled with connectors (not shown) or conventionally connected by twist-on wire connectors or the equivalent. The gap G can be closed by a short raceway slip cover member 300, which is of U-shape, and has an internal contour to fit over the external contour of the raceway covers in the assemblies 200, 200, and to overlap these assemblies as shown in FIG. 3 for example. Alternatively, the gap G in the raceway assemblies 200, 200 can be used to provide an obstacle clearance component such as shown at 400 and 500a in FIG. 6. More generally, this gap G can be utilized to accommodate T-fittings, outlet device brackets and slips covers, internal and external elbows, and flat elbows, all as shown in FIG. 5.

Figure 7:
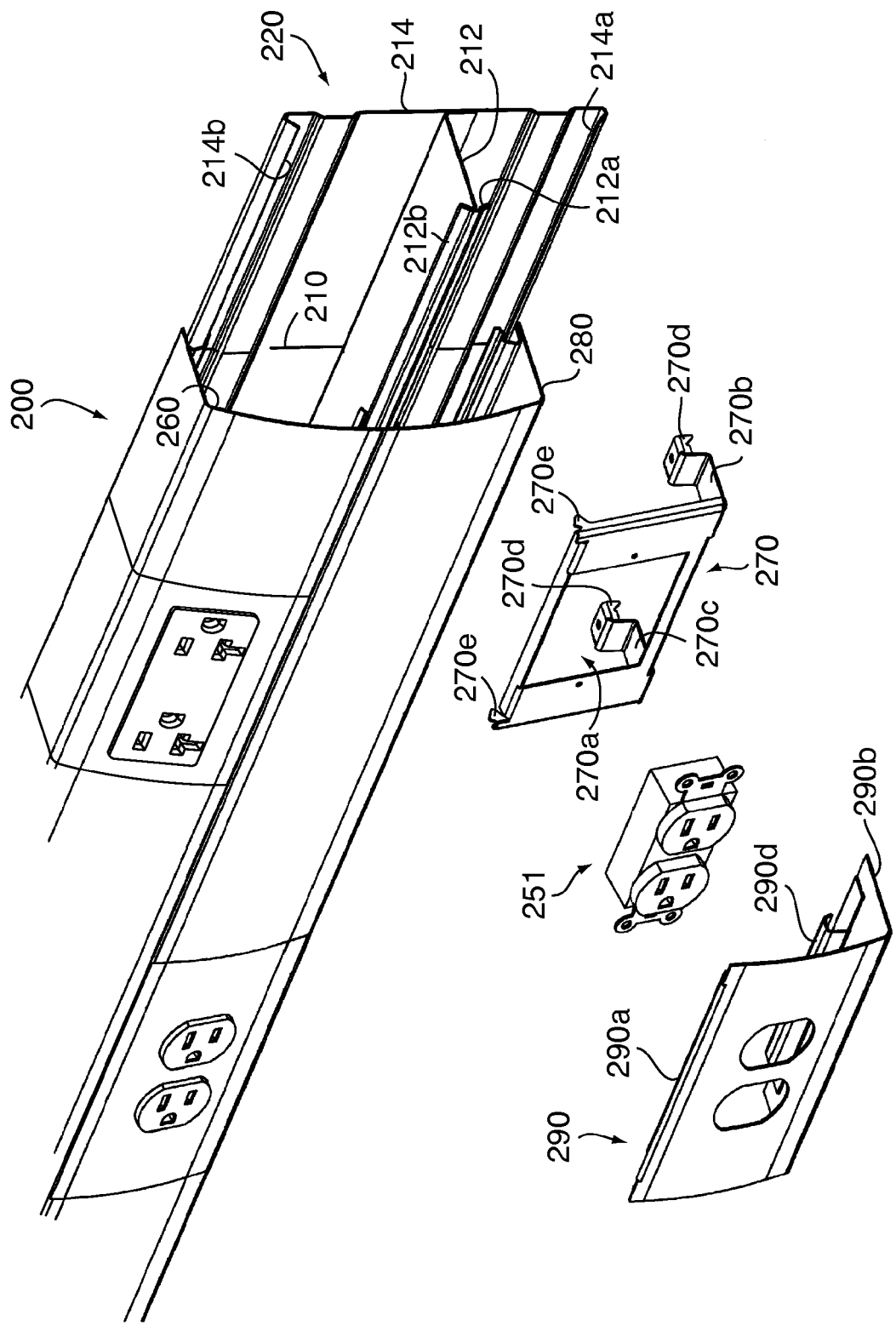
FIG. 7 shows in exploded relationship the various components required to install outlet device brackets in the lower wireway of a raceway in accordance with the present invention.

The raceway assemblies 200, 200 comprise a T-shaped base component such as shown at 220 in FIG. 7, plus two raceway cover components 260 and 280, each being of L-shape and snapped into the base 220 as suggested in FIG. 7. This configuration allows outlet devices to be placed at any location in the raceway assembly, and in either one or both of the upper and lower covers. FIG. 7 shows one outlet device for assembly in the front wall of the lower wireway between spaced apart raceway cover components (one shown at 280).

Figure 2:
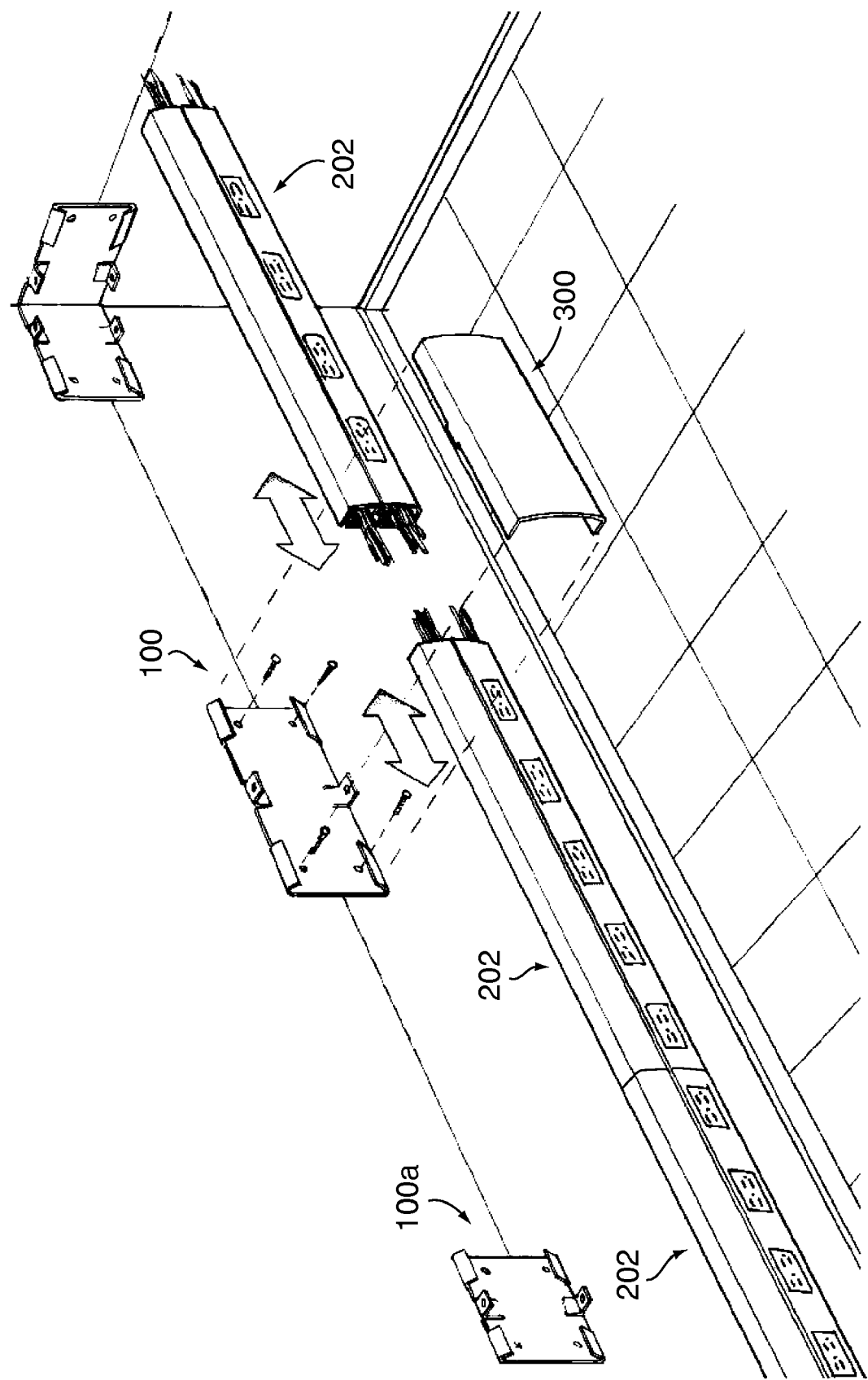
FIG. 2 is an exploded view of the components of the present invention as adapted for use in a modular raceway system that not only includes preassembled cables in the various raceway sections, but also including pre-wired electrical outlet devices in the lower raceway.
Figure 24:
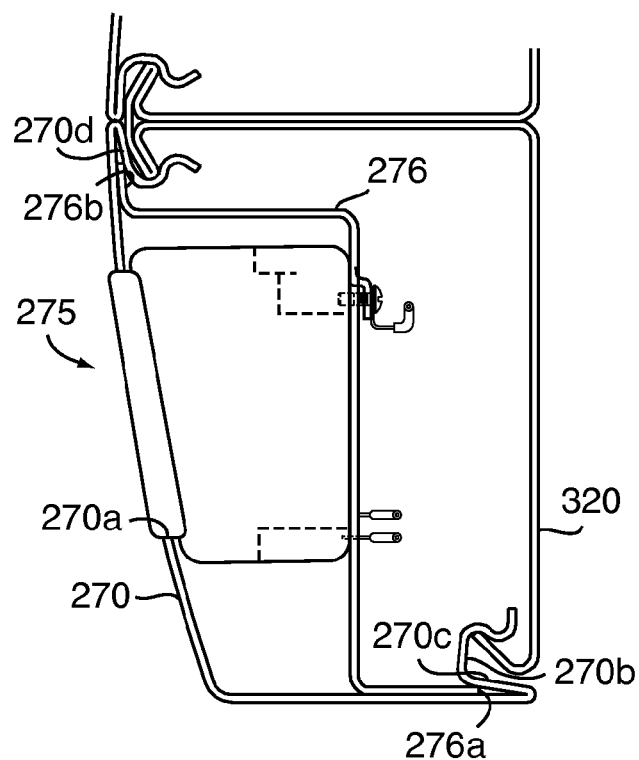
FIGS. 24-26 show a raceway cover component, such as described above, having an L-shape and mounted on a raceway base to and from a wireway. The cover has cutouts to receive additional plugs similar to those sold by The Wiremold Company.
Figure 25:
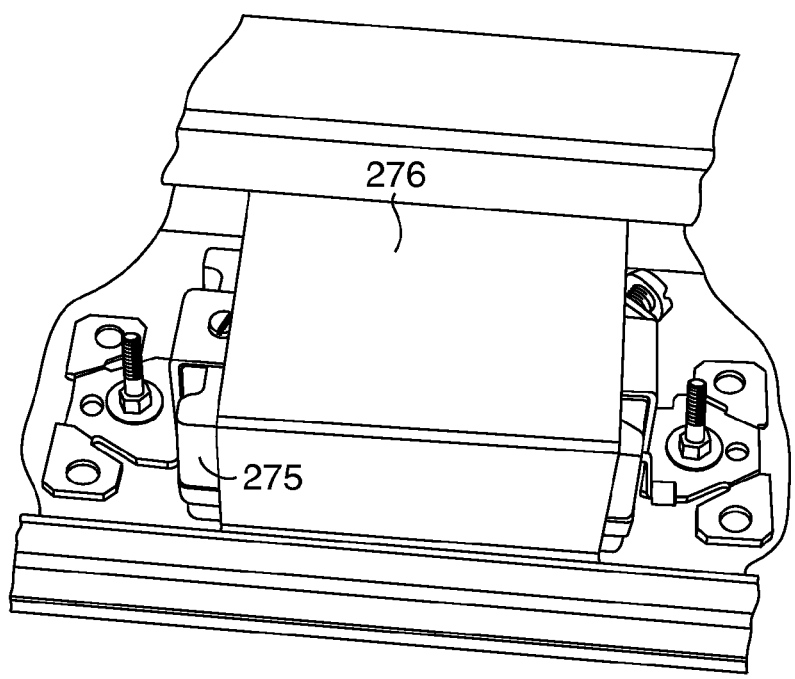
Figure 26:

FIG. 2 shows the same components as depicted in FIG. 1 except that the raceway assemblies 202 are not only pre-wired, but are also fitted with pre-wired outlet devices. Pre-wired raceway of this type is available, but not in with an L-shaped cover used with a T-shaped raceway base to achieve the results set forth herein. FIGS. 24-26 show this assembly in greater detail and will be described in greater detail below.

Turning next to a detailed description of FIG. 3, various configurations for mounting outlet devices are illustrated for use with a raceway assembly constructed in accordance with the present invention. For example, in the gap G between adjacent raceway assemblies 200, 200, an assembly similar to that shown at 310 in FIG. 5 can be installed providing a multitude of outlet devices, including a "down light." As a result of the unique L-shaped configuration for the raceway covers, it is possible to provide outlets in the downwardly facing side wall of the lower raceway cover.

Individual device brackets for both the upper and lower wireways defined in the raceway of the present invention are indicated generally at 320 and 340 in FIG. 3, each being designed to accommodate a device such as an outlet plug. A cover or half cover is provided for each of these device brackets, and the upper cover may include a frame to accommodate data ports while the lower half cover may include a snap-in outlet device plate, or the outlet device plate can be provided in one piece with the half cover as described hereafter.

Still with reference to FIG. 3, and in locations where the adjacent raceway assembly end portions abut, so as to provide a continuous back plane for the raceway in a manner to be described, a somewhat shorter raceway coupling slip cover 390 can be fitted as shown. Furthermore, the opportunity for providing downwardly facing outlet devices permits power cabling such as indicated at 395 to be hidden from view and to be protected from the environment. This location for outlet plugs provides power leads 395 in a protected area below the raceway, and between the raceway and the floor.

Figure 4:
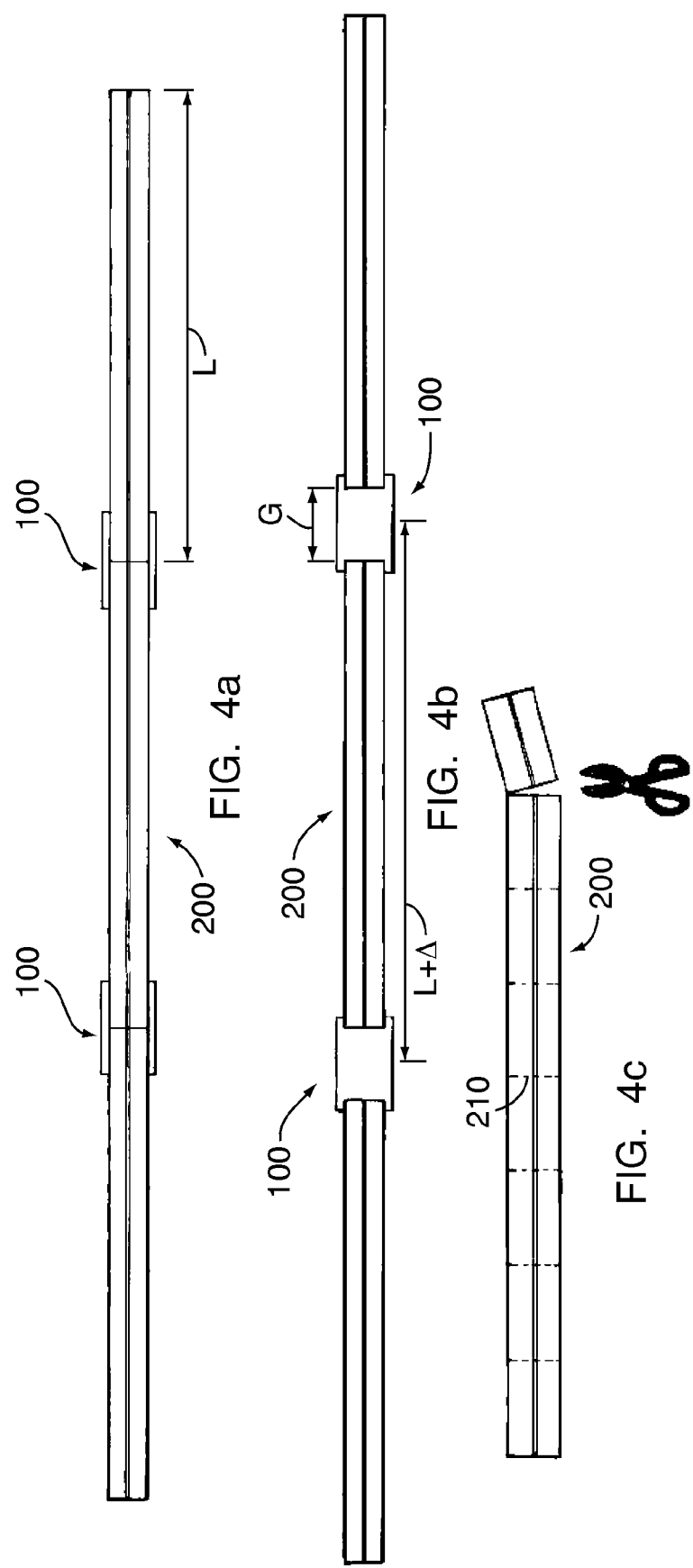
FIGS. 4a-4c show in several schematic views the advantage to providing predetermined length raceway base sections together with brackets for supporting these raceway base sections, to mount on a wall structure of varying length, yet with the same raceway components. These figures also illustrate the lines of weakening provided in the raceway base to achieve somewhat shorter raceway sections for wall lengths that require less than these "minimum length" raceway sections.

FIGS. 4a-4c illustrate the flexibility of raceway assemblies constructed in accordance with the present invention, and show in somewhat schematic fashion the support brackets 100 together with aligned raceway assemblies 200, 200. In FIG. 4a, the raceway assemblies 200, 200 are shown in an abutting relationship. In FIG. 4b, the raceway assemblies 200, 200 are shown in a spread relationship so as to provide a gap "G" between the end portions of the adjacent aligned raceway assemblies 200. FIG. 4c illustrates a feature of the raceway base of the present invention whereby lines of weakening 210, 210 are provided incrementally along the length L of the raceway base. As a result of this configuration three standard length (L) raceway segments 200, 200, each eight feet in length for example, can be used to accommodate either a 24 foot span of wall, or can be expanded to provide an extra one foot four inches along the wall as a result of the gaps G provided between each of the raceway assemblies. The scoring of the eight-foot raceway sections in predetermined increments allows even more variation in the overall raceway length that can be accommodated with a minimum of installation effort.

Figure 16:
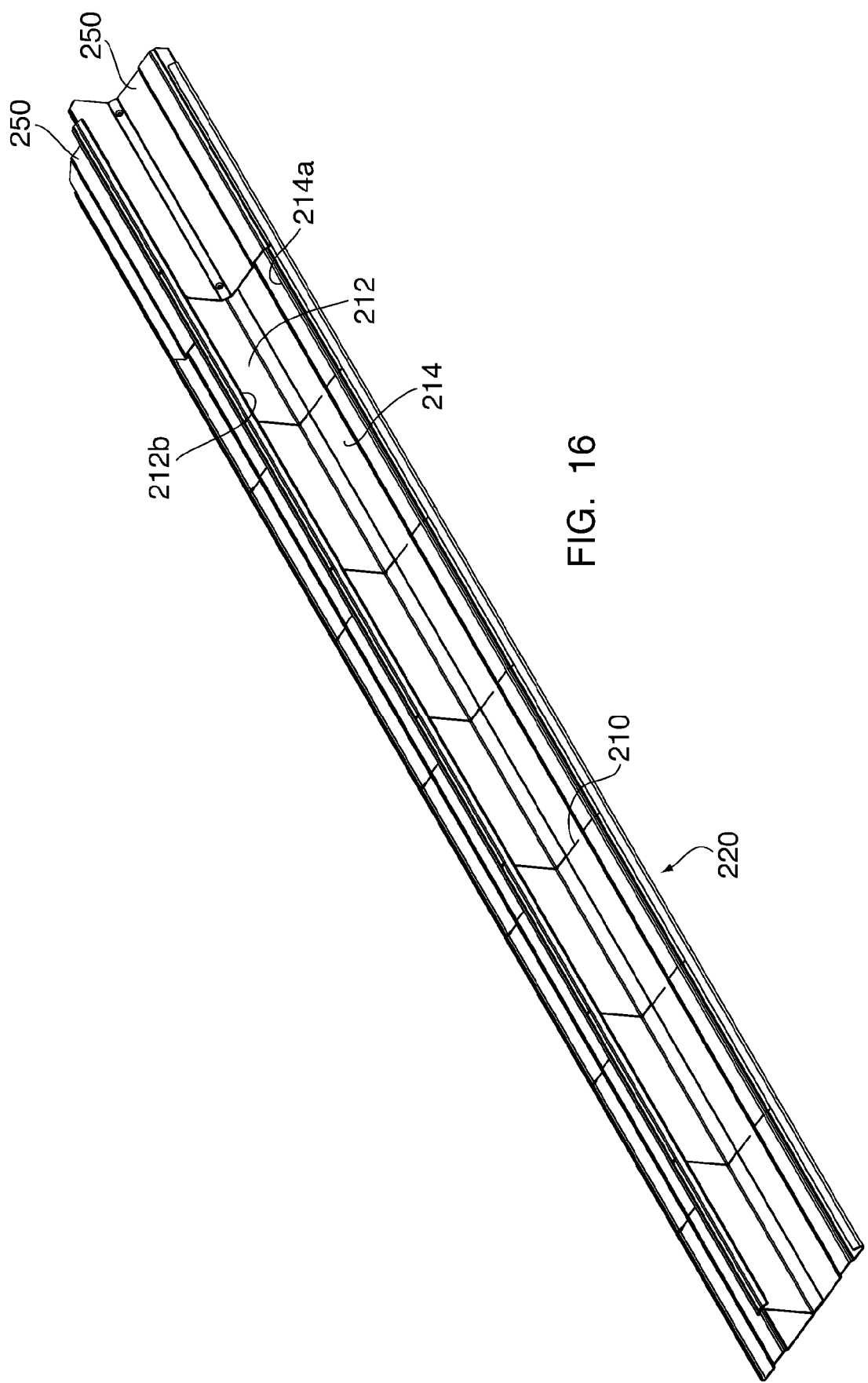
FIG. 16 shows a T-shaped raceway base 220 having an integrally formed divider, and the same lines of weakening provided at predetermined intervals. Raceway covers 260 and 280 (see FIG. 17) can be shaped into assembly with the base as described above. To join aligned raceway base components to one another at installation, couplers 250, 250 are shaped into the wireway defining walls of the T-shaped base.
Figure 16A:
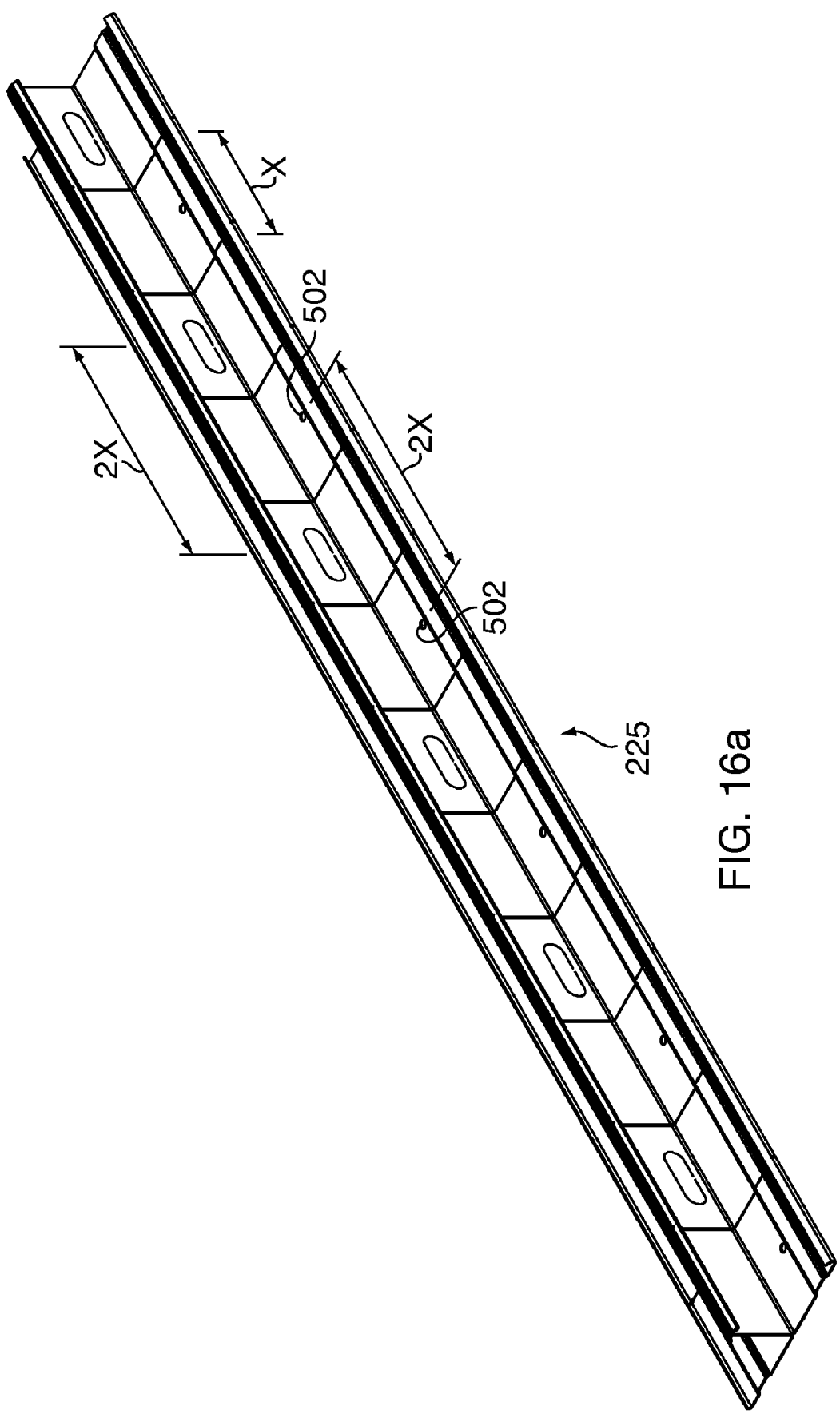
FIG. 16a shows a T-shaped base 225 having spaced lines of weakening, and alternately arranged knock-out openings in the web, and in the base for mounting to a wall structure. The knock-out openings provide access for wiring between wireways.

In a preferred embodiment, to be described with reference to FIG. 16a, these lines of weakening are only 4 inches apart, as shown at "X." A more convenient fit to the convention stud spacing (16 inches or 24 inches) in conventional wall structures can be achieved with the pre-punched base plate mounting holes 502, 502 spaced 2 inches from every other line of weakening (e.g., spaced "X/2"), providing a spacing between mounting holes of "2X." The same spacing "2X" is provided between the knock-out openings in the web portion of the T-shaped base as shown in FIG. 16a. Finally, the slip covers, 300 for example, are preferably half again as long as the spacing X, or 1.5 times X of the lines of weakening 210, 210 in the preferred embodiment (e.g., 6 inches for the preferred 4 inches spacing).

It is noted here that installers of present day raceway must use precision cutting tools that are designed to sever a rather heavy gage steel raceway base, that is generally of U-shape. Often times the cut is not square, or otherwise of sufficient precision to satisfy either UL requirements, or the installer/customer's needs.

Although present day covers for use with conventional U-shaped raceway base configurations can be conveniently cut because they are flat, the flanges on the back side of the these covers can lead the installer to uneven cuts, resulting in an imperfect raceway installation. Even the untrained eye can be expected to pickup defects such as these. The present invention effectively obviates or at least minimizes the opportunity for such imperfections.

The purpose then of the present invention is to provide a unique raceway system that is not only of modular construction as mentioned above, but that also includes a raceway base which is provided with conveniently located lines of weakening 210, as described above with reference to FIGS. 4a-4c. Such a raceway system leads to greater flexibility in the location of outlet devices in the one wireway associated with the power leads, and in the adjacent wireway associated with the data/telecom cabling. See for example in FIG. 3 where the "activations" for both power and data can be accommodated "anywhere" along the length of the individual wireways rather than requiring all "activations" to be provided in an oversized multipurpose installation such as illustrated at 310 in FIG. 3. Such an installation is possible in the present raceway system.

Turning next to FIG. 7, and in accordance with the present invention, a modular raceway system of the present invention comprises elongated raceway base plates 220 having the lines of weakening such as indicated generally at 210. Each base plate includes a forwardly projecting web portion 212 formed integrally with the back plate 214, either by spot welding or in the event the material is suitable by extrusion. This T-shaped base configuration gives rise to advantages not available in more conventionally shaped raceway base structures. As mentioned above, a 4-inch spacing between adjacent lines of weakening 210, 210 is preferred. Pre-punched holes spaced 2 inches from the lines of weakening also contribute to efficiency during installation.

In prior art raceways, of the type made from rolled steel for example, the raceway covers span the opening defined by a U-shaped base. See for example the two-piece steel raceway available from The Wiremold Company of West Hartford, Conn. under their 6000 and 4000 style two-piece metal raceway. The present invention on the other hand provides a raceway base plate that is of T-shape cross section such that the forwardly projecting web portion defines a divider 212 between two adjacent wireways, that are further defined by separate wireway covers 260, 280. This configuration allows these raceway covers 260 and 280 to be preassembled, or separately assembled with the raceway base 214, and consequently provides opportunity for the placement of outlet devices in staggered locations along the raceway as suggested in FIG. 7. Installing individual outlet devices, in one or the other of these separate wireways provides an advantage over the prior art two-piece metal raceways.

Still with reference to FIG. 7, the covers 260 and 280 are preferably identically configured, and the corresponding wireways also of equal cross-sectional area or volume. The lower raceway cover 280 is shown to be coextensive in length with that of the upper raceway cover 260 in FIG. 7, but this equivalency is not required. Each cover component can be of any length. Thus, individual outlet devices associated with each of these raceways can be provided in staggered relationship along each wireway so the raceway assembly can take a variation of forms as shown in FIG. 3 and FIG. 7.

Turning now to a more detailed description of the several ways in which outlet devices can be mounted in the raceway assembly, an L-shaped device bracket 270 is shown in FIG. 7, and includes an opening 270a for receiving an outlet device, such as indicated generally at 251. The L-shaped device bracket 270 includes rearwardly extending lower portions 270b and 270c, which have spaced-apart end portions 270d that are identically formed so as to be received on the angled flange 214a that extends the full length of the raceway base 214. The socket defining portions 270d of the L-shaped device bracket 270 are received by the flange 214a and allow the installer to pivot or snap the device bracket 270 in place, and in assembled relationship with the downturned lip 212a of the divider 212 on the raceway base. The device bracket 270 also has inwardly bent flanges that define end portions 270e, 270e provided specifically for this purpose.

It will be apparent that the L-shaped device bracket 270 can be configured to receive outlet devices such as that shown at 251. Outlet devices with different configurations, as for example data/communication jacks, can also be provided in the device bracket 270, and mounted in the upper wireway defined between the raceway base 214 and cover 260. A downwardly inclined flange 214b on the raceway base 214 cooperates with the upturned flange 212b on the divider wall 212 for this purpose. Since both wireways are preferably identical, the same device bracket 270 can be assembled in both the upper wireway and the lower wireway.

Still with reference to FIG. 7, a cover plate 290 is adapted to fit over the outlet device 251 and is fitted to the raceway itself even as does the device bracket. This cover plate overlaps the cover segments 260, 280. The cover plate 290, like the device bracket 270, is generally L-shape in cross-section, and includes a rearwardly projecting wall 290b, having a socket shaped end portion or flange 290d, which is adapted to engage the aforementioned flange 214a of the raceway base. The flange 290a fits between the socket portions 270d, 270d on the device bracket 270. As so constructed and arranged, the cover plate 290 can be assembled over the device bracket by providing this socket flange 290d in the space between the leg portions 270b, 270c of the device bracket, and pivoting the cover 290 in place over the outlet device 251. The upper marginal edge 290a is configured to be received between the portions 270e of the device bracket as assembled with the base flange 212a. A secure assembly is provided for the outlet device 251. Steel material is preferably selected for fabrication of the raceway base and covers and provides continuity or grounding throughout the assembly of a raceway constructed in accordance with the present invention. So too the device bracket 270 is also fabricated from an electrically conductive metal material.

Figure 8:
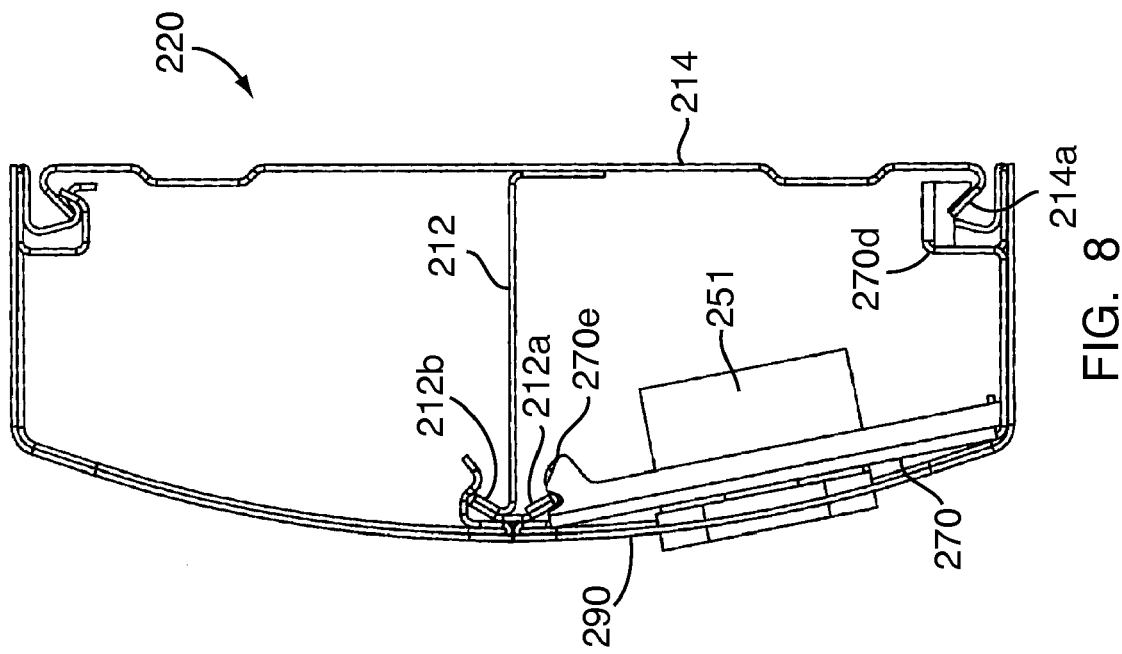
FIG. 8 shows in cross section the assembly of the components illustrated in FIG. 7.

FIG. 8 shows in cross-section the assembly described in the proceeding paragraphs, and illustrates the interlocking arrangement provided for between the raceway base flange 214a and the socket defining end portions of the rearwardly projecting legs 270d of the device bracket. Also shown in FIG. 8 is the rearwardly projecting portion 270e of the device bracket, which cooperates with the angled marginal edge 212a of the divider 212. The bracket cover 290 has openings, best shown in FIG. 7, for receiving the outlet device 251. The outlet device itself maybe secured to the device bracket 270, preferably by conventional screw fasteners (not shown).

Figure 9:
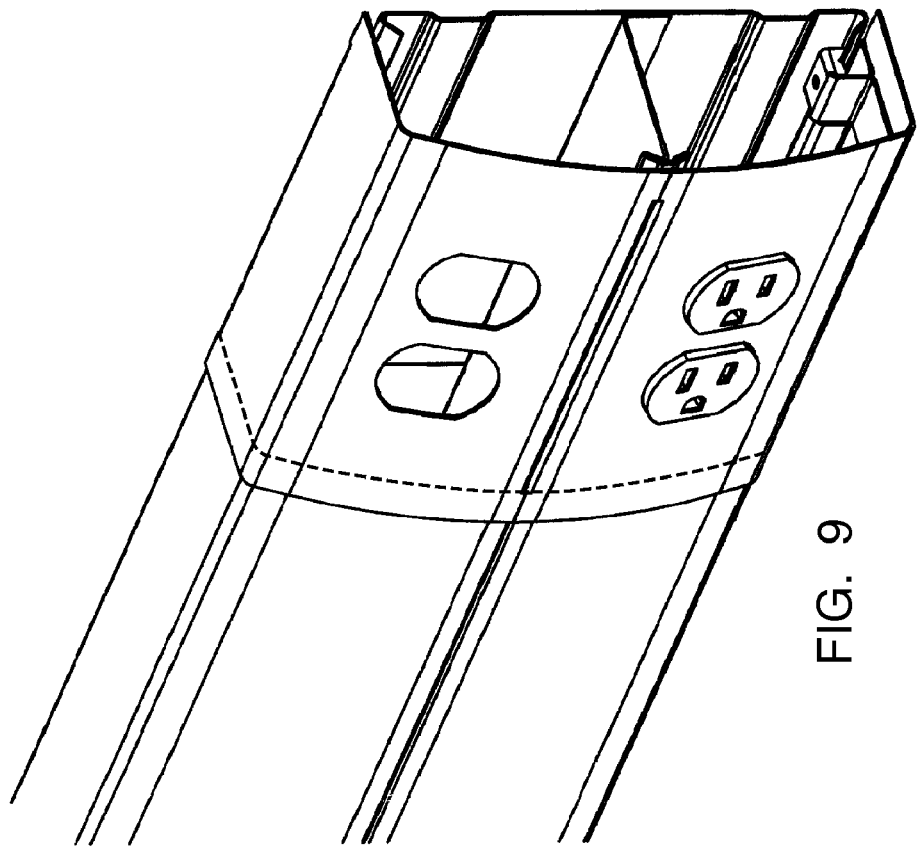
FIG. 9 shows in perspective view the assembled components of FIG. 8.

Although the staggered relationship between the devices in the upper and lower wireways illustrated in FIG. 7 is an advantage of the present invention, it will be apparent from FIGS. 7, 8 and 9 that outlet devices can be stacked one above the other in a conventional configuration. Thus, the raceway system of the present invention has all of the advantages of prior art systems, and has added advantages over prior art raceway systems.

Figure 10:
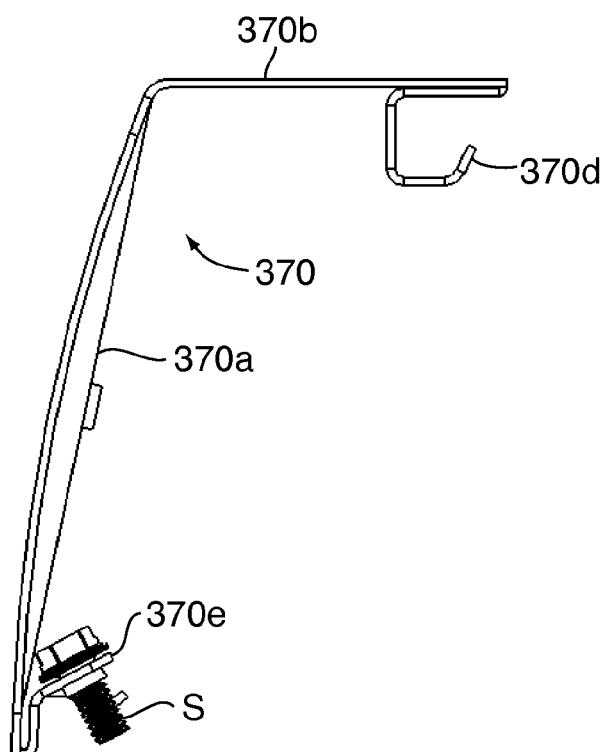
FIG. 10 is an end view of an L-shaped device bracket for assembly with the T-shaped base between aligned cover components associated with the top or upper wireway.
Figure 11:
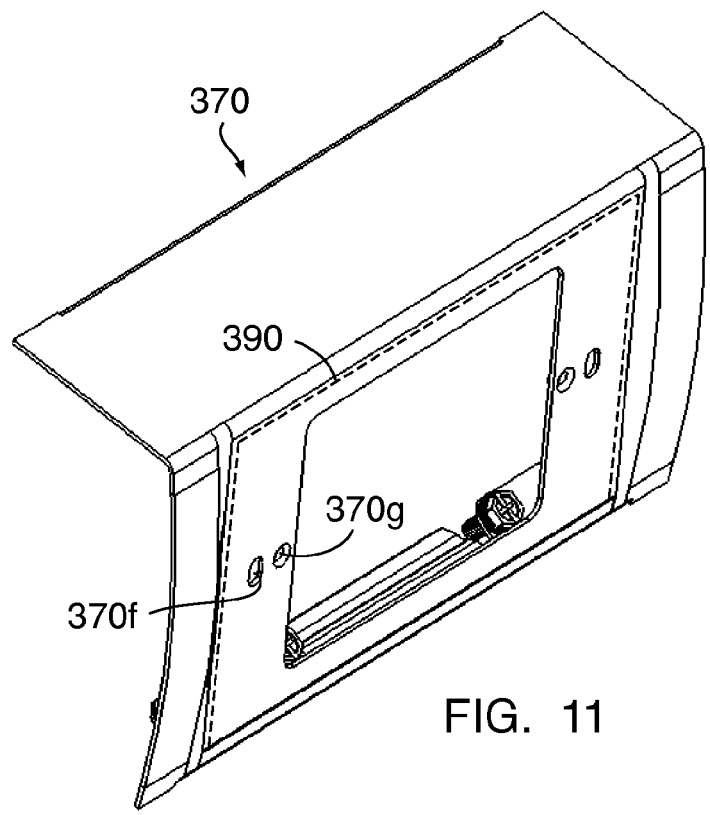
FIG. 11 is a top perspective view of the device bracket shown in FIG. 10.
Figure 12:
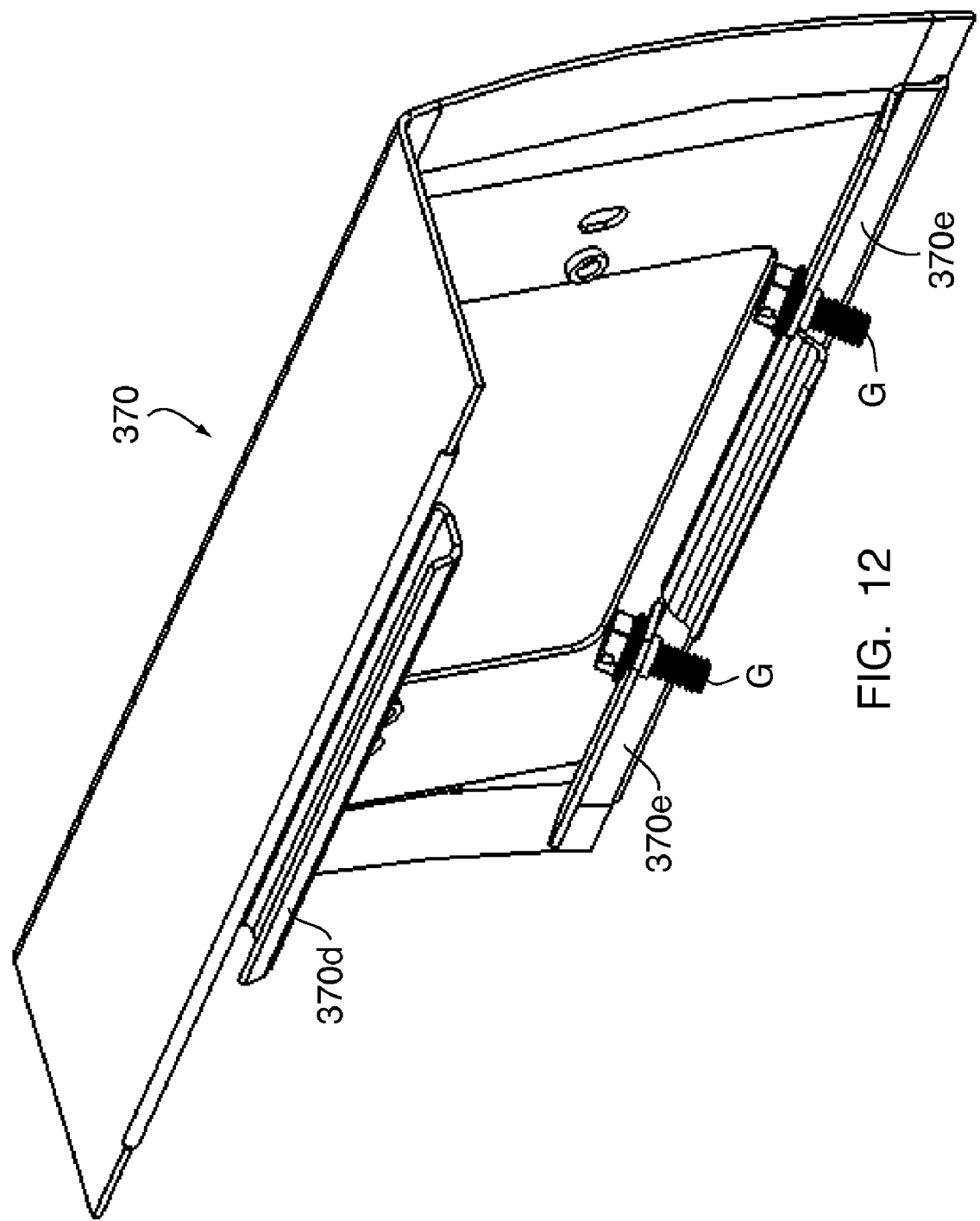
FIG. 12 is a rear perspective view of the device bracket of FIGS. 10 and 11.

FIGS. 10, 11 and 12 illustrate a device bracket 370 of slightly different geometry. The device bracket 370 is designed to accommodate a more conventional cover plate 390. The rectangular-shaped, conventional cover plate 390, which is representative of present day outlet device cover plates generally, can be fastened to the device bracket 370 as suggested by the broken lines of FIG. 11. As shown in FIG. 10, the device bracket 370 has a socket defining portion 370d formed on the inner top side of the L-shaped bracket, and this side 370b is oriented at an angle so as to form the L-shape with respect to the device bracket wall 370a, that will accommodate the outlet device itself.

FIG. 11 illustrates the device bracket 370 of FIG. 10 in a front top perspective view, with the outline of a conventional cover plate 390 being illustrated in broken lines to show how the device bracket 370 accommodates both the outlet device and the conventional cover plate. Suitable openings are provided adjacent to the outlet device opening in the device plate 370 for receiving both the screws associated with a conventional outlet plug, and other styles of cover plates associated with non-metal raceways.

Still with reference to the device bracket 370, FIG. 12 illustrates the shortened socket portion 370d of the device bracket 370, which engages the downturned flange portion 212a of the divider 212 in the base 214 of the raceway. A rearwardly projecting flange 370e provided on the lower edge of the device bracket 370 engages the flange 214 on the marginal edge of the web of the raceway base. Grounding screws G, G are provided to securely anchor the device bracket 370 in place, and to serve as a continuity or grounding connection as between the device bracket 370 and the raceway cover of the raceway assembly.

Figure 13:
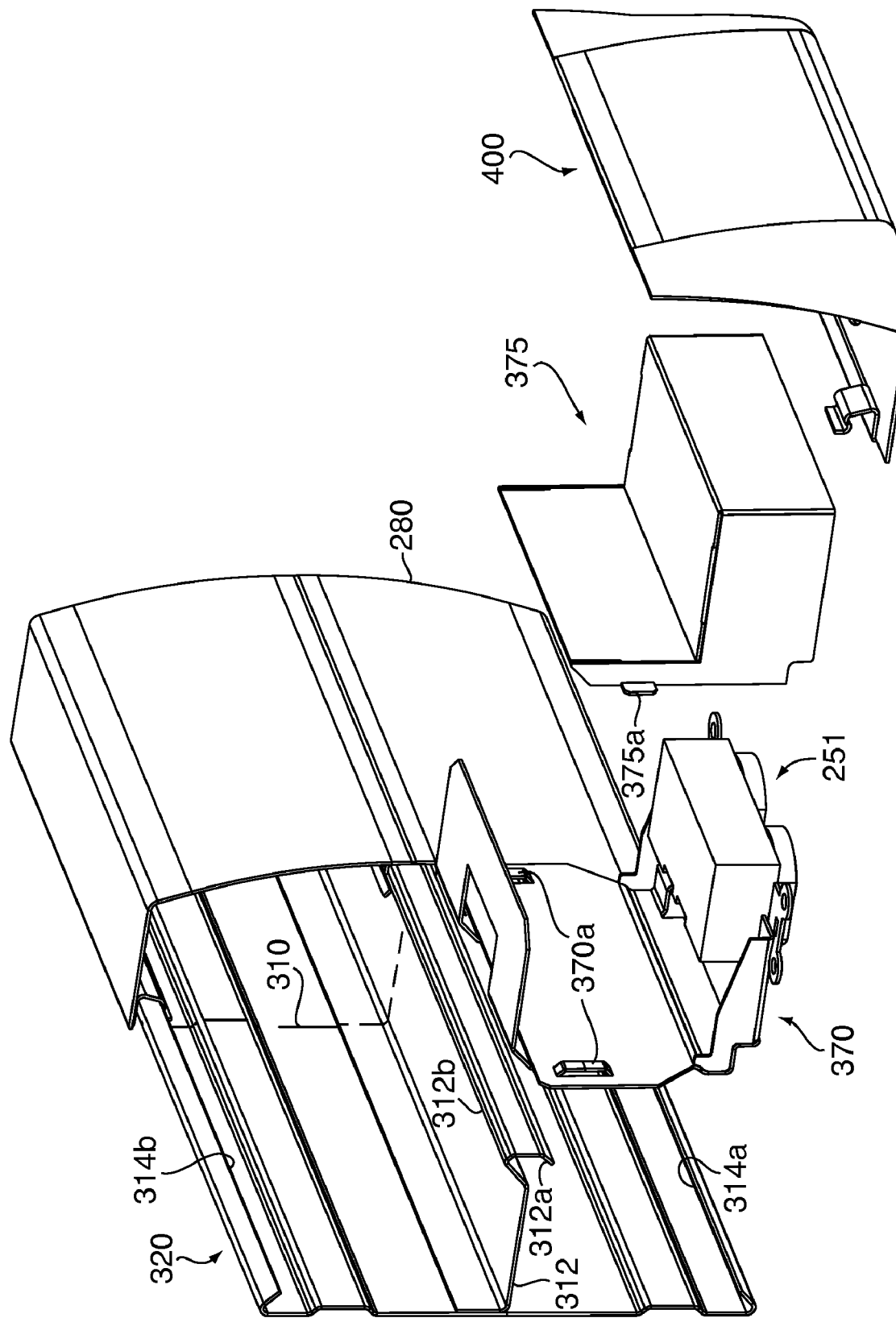
FIG. 13 is an exploded perspective view of an alternative design for a device bracket with a downwardly facing outlet device and enclosure and escutcheon components for assembly therewith.
Figure 14:
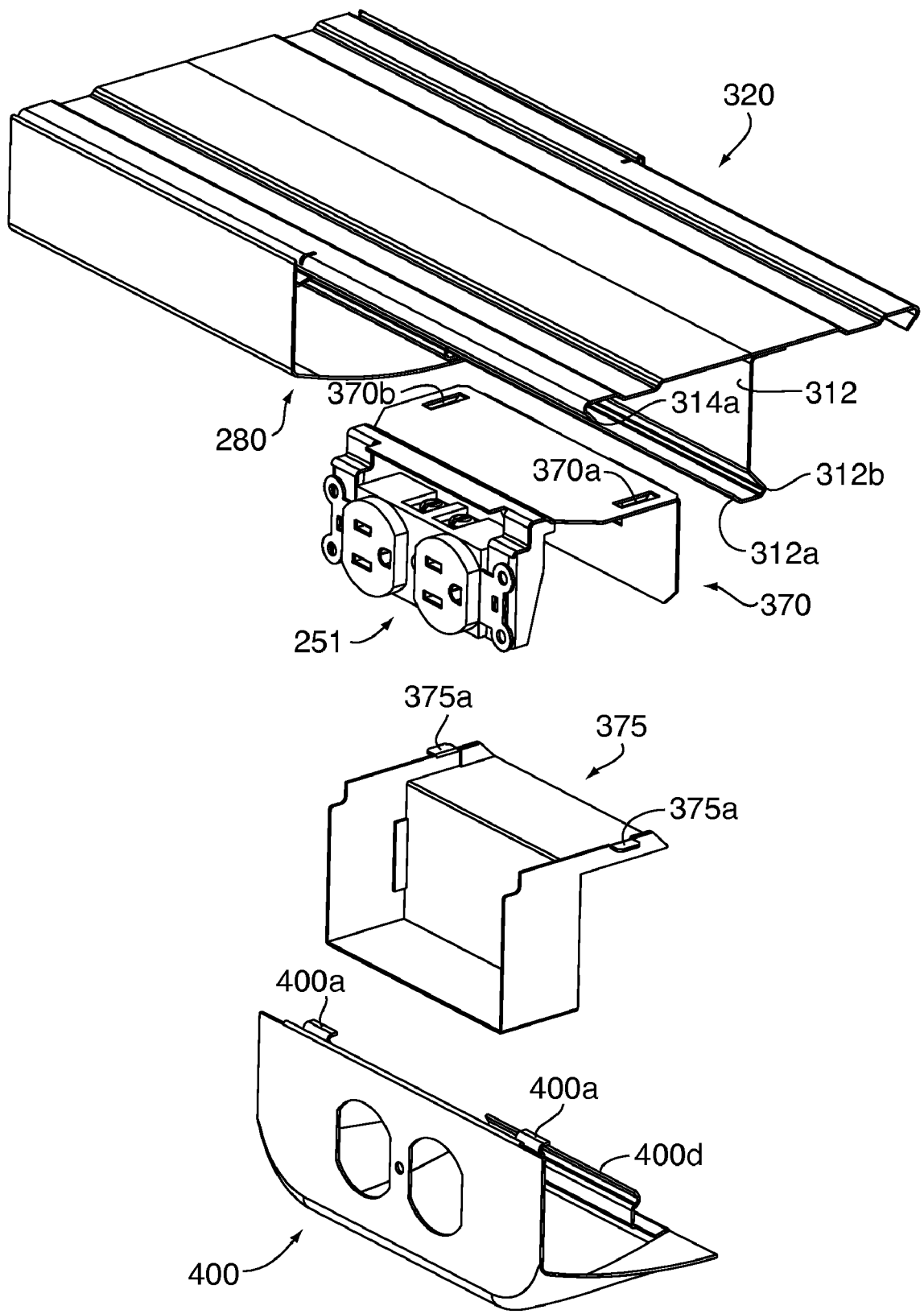
FIG. 14 is an exploded rear quartering perspective view of the device bracket and associated components.
Figure 15:
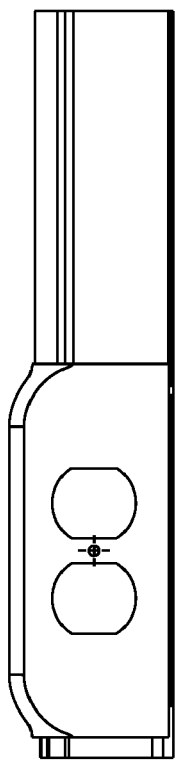
FIG. 15 is a bottom view of the assembled components from FIGS. 13 and 14.

FIGS. 13, 14 and 15 show still another version of outlet device bracket 370, one that also allows the device to be mounted between raceway cover components in the raceway assembly in order to provide the outlet plug at a location that does not detract from the overall appearance of the raceway assembly itself. More particularly, the device bracket 370 is so mounted that the outlet device 251 faces downwardly, affording the opportunity to hide both the outlet plugs from view, and to make the wires extending to and from that plug much less noticeable than is the case with present day outlet device-equipped raceways of the surface or wall mounted type.

FIG. 13 also shows a slightly modified configuration for the divider 312 in the raceway base 320, the raceway base being otherwise similar to that described previously, and having marginal edges 314a and 314b defined along the marginal edges of the base, and having angled portions 312a and 312b defined along the free end portion of the web or divider 312. Thus, the raceway base 320 is quite similar to that described previously with reference to the raceway base 220, and preferably includes lines of weakening 310 and mounting holes (not shown). It will be apparent that device brackets of the type described previously with reference to FIG. 7 and FIGS. 10-12 inclusively can also be used with the alternative raceway base plate 320 of FIG. 13.

In order to take advantage of a downwardly facing outlet plug 251 such as shown in FIG. 13, a unique configuration is provided for the device bracket. The device bracket 370 of FIG. 13 is shown in exploded relationship to the raceway base, whereas in FIG. 15 the device bracket is shown in an assembled relationship with the raceway base. A raceway cover is also shown assembled with the raceway base in FIG. 15.

With reference to FIG. 13, the device bracket 370 can be seen to have a generally U-shaped configuration, the lower legs of the "U" being spaced apart to receive the outlet device 251. The upper legs of the U are oriented parallel to these lower legs, and are provided alongside the divider 312. The outlet device 251 and its device bracket 370 are isolated from the lower wireway by a retaining box 375 mounted on the device bracket 370. These components are held in assembled relationship by the ears 375a on box 375 that cooperate with slots 370a in the device bracket for this purpose. Retaining box 375 not only affords protection for the connections made with the outlet plug 251 at assembly, but also serves to define a protective passageway that will accommodate wiring running through the lower wireway in the raceway assembly.

FIG. 14 shows these components from below, as adapted to be assembled with the raceway base 320 to be provided between spaced raceway covers 280. The cover plate 400 serves as an escutcheon plate for the downwardly facing outlet plug 251. The socket portions 400a and 400d, provided at the ends of the L-shaped cover 400, allow snap-in assembly of the cover 400. More particularly these socket portions fit onto the flanges 312a and 314a of the base 312. The cover plate 400 is designed to accommodate the outlet device 251, but other configurations (not shown) can be fabricated to accommodate other types of electrical devices, such as jacks or down lights as shown in FIG. 5.

By way of summary and with reference to FIGS. 13, 14 and 15, it will be apparent that raceway assemblies fitted with an outlet device plate in the downwardly facing wall of the raceway present an architecturally pleasing raceway appearance as this configuration obscures the outlet plug from view. Thus, the eye of the observer does not pick up such locations for the outlet plugs as readily as with conventional raceways generally. Further, the electrical cords that will be later plugged into such downwardly facing outlets located in the lower wall of the raceway are also obscured from view, giving rise to an improved appearance for the space serviced by the raceway of the present invention, as compared to conventional raceways generally.

In addition, this configuration puts the plug in a more protected environment. Whereas conventional, present day raceways include a base component of generally U-shape with vertically spaced top and bottom boundaries or walls formed integrally with a generally flat base which is mounted to the wall, the provision for outlet devices in that lower wall is virtually precluded, or at least rendered difficult, by virtue of the fact that the wall is integral with the base. In the T-shaped raceway base plate of the present invention, on the other hand, no bottom wall is required, and the bottom wall of the raceway is instead defined by the cover, leading to greater flexibility for locating outlet devices. More particularly, the cover's L-shape cross section affords opportunity for mounting downwardly facing device brackets, and brackets for other purposes such as lights, without requiring any cutting away of the raceway base. Therefore, the raceway design of the present invention affords not only a more aesthetically pleasing appearance to the observer, but also provides for functional advantages not readily available with raceway configurations currently available.

As previously described with reference to FIGS. 4a-4c, raceway mounting plates can be provided at spaced intervals along a wall, and preassembled raceway assemblies of predetermined length can be secured to these mounting plates to leave a gap between the adjacent end portions of the aligned raceway base plates. Thus, these mounting plates serve as coupling means to provide a continuation of the rear boundary of the upper and lower wireways so that the wireways need not be defined by the wall, but as instead defined by the metal covers and the metal mounting plates at least in the areas of these gaps. As mentioned previously, the lines of weakening in the raceway base plates facilitate the installation process in that the precise cutting of the raceway base (required with present day U-shaped two piece metal raceway generally) is rendered unnecessary, and the installer can instead make rough cuts or simply break apart the raceway base at a line of weakening.

It is also a feature of the present invention that these raceway base plate components can be assembled directly to the wall without requiring mounting plates. In order to provide another form of coupling means, to form a continuation of the metal back plane for the wireways defined by the aligned L-shaped raceway base components, the present invention contemplates individual coupling wireway elements, in the form of the couplings shown at 250, 250 in FIG. 16. FIG. 16 shows a raceway base plate 220 of T-shape cross section having a plurality of score lines 210, 210 in the manner described previously with reference to FIGS. 4a-4c. In lieu of the mounting plates shown in FIGS. 4a-4c, coupling means, in the form of elements 250, 250, are snapped into place between the projecting T-shaped web 212 and the rear wall 214 of the raceway base 220. More particularly, the marginal edges of each coupling member or element 250 are received between the lip 212b at the free end portion of the web 212, and the longitudinally extending marginal edge 214a of the back portion of the raceway base. See FIG. 16 for details on the preferred form for the T-shaped raceway 225. With reference to FIG. 16a, note the spacing "X" between the lines of weakening, and the spacing "2X" between the knock-out openings and mounting holes 502. X is preferably a division of 16 and 24, and 4 inches has been found to be a suitable spacing X.

Figure 17:
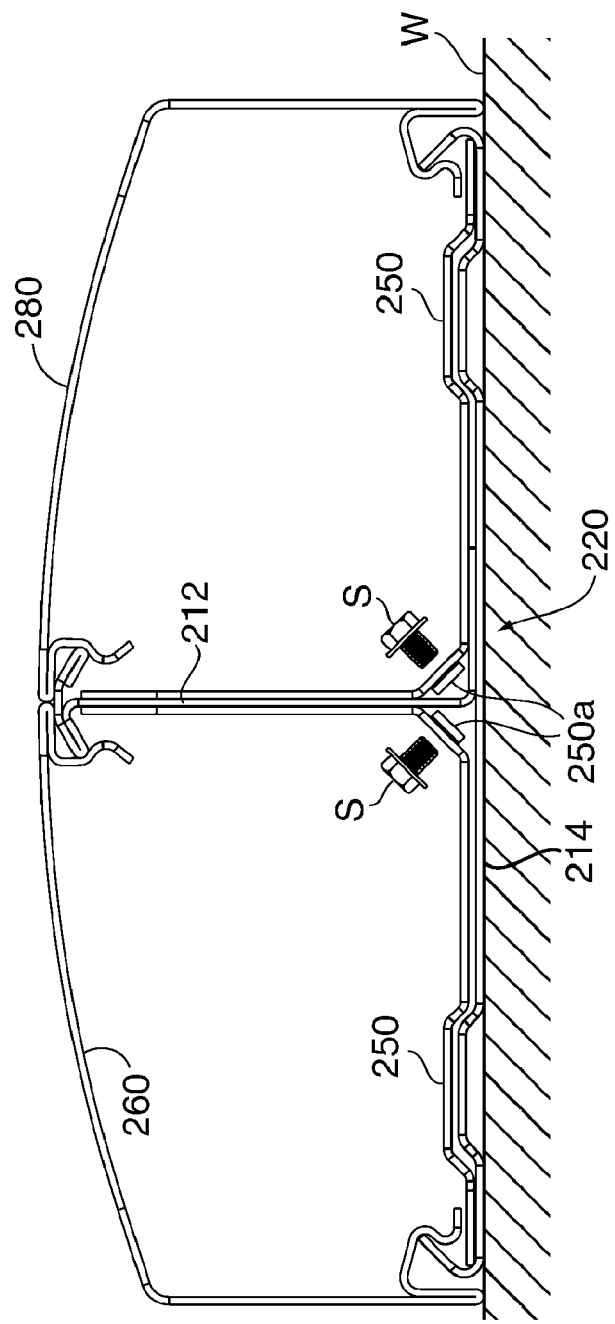
(FIG. 17 shows the couplers 250, 250 secured into the raceway base 220 in more detail.)
Figure 17A:
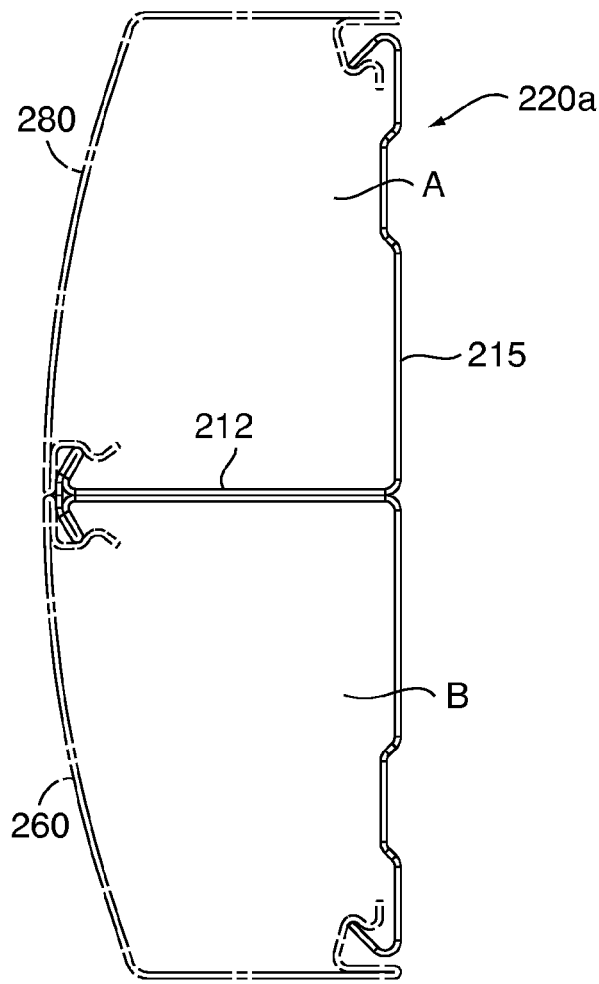

FIG. 17a shows a preferred one-piece, metal raceway base configuration 220a with the top and bottom wireways, A and B respectively, defined by a web divider portion 212 formed with a double thickness, such that the web 212 forms a 90° bend with respect to the base 215.

Figure 17B:
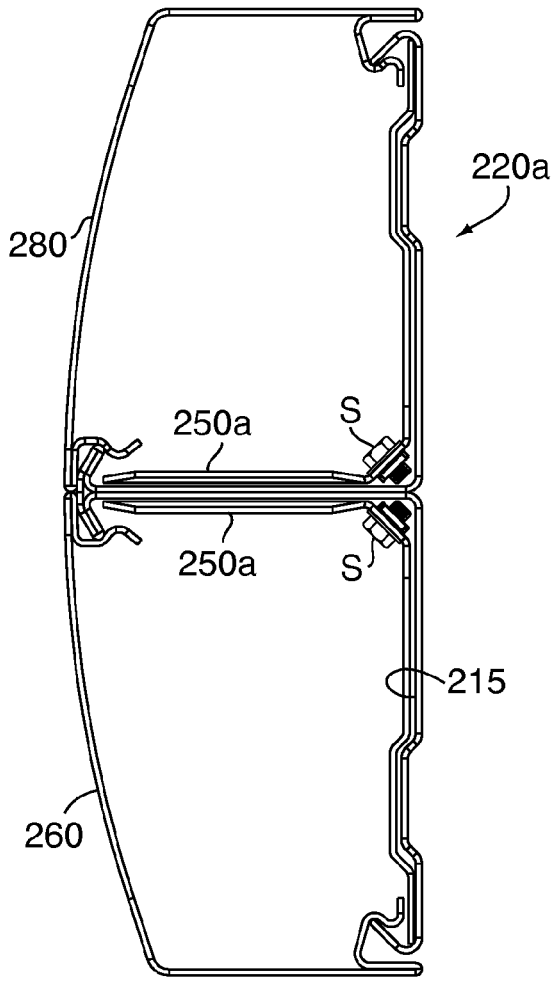
FIG. 17b is a view of the base in FIG. 17a, assembled as in FIG. 17.

FIG. 17b is similar to FIG. 17, but shows slightly different coupler elements 250a, 250a in combination with the base 220a of FIG. 17a.

FIGS. 17 and 17b show the raceway coupling members 250 and 250a as held in place by screw fasteners S, S. The screw fasteners are threadably received in openings provided for this purpose at the vertex of each coupling member 250 and 250a. FIGS. 17 and 17b also illustrate the nesting relationship between the back wall 214 and 215 of the raceway base 220, 220a and these coupling elements 250, 250a. It will be apparent that these coupling elements 250, 250a serve the purpose of coupling adjacent end portions of raceway base members as described above, without interfering with the raceway covers 260 and 280, the cover components being held in place by the same marginal edge portions of the raceway base and the lips defined at the free end portions of the web 212 all as described previously with reference to these raceway covers 260 and 280. Thus, the separate wireways defined by the T-shaped raceway base 220, 220a and the raceway covers 260, 280 are continued and defined in part by these unique raceway coupling elements 250, 250a.

Figure 18:
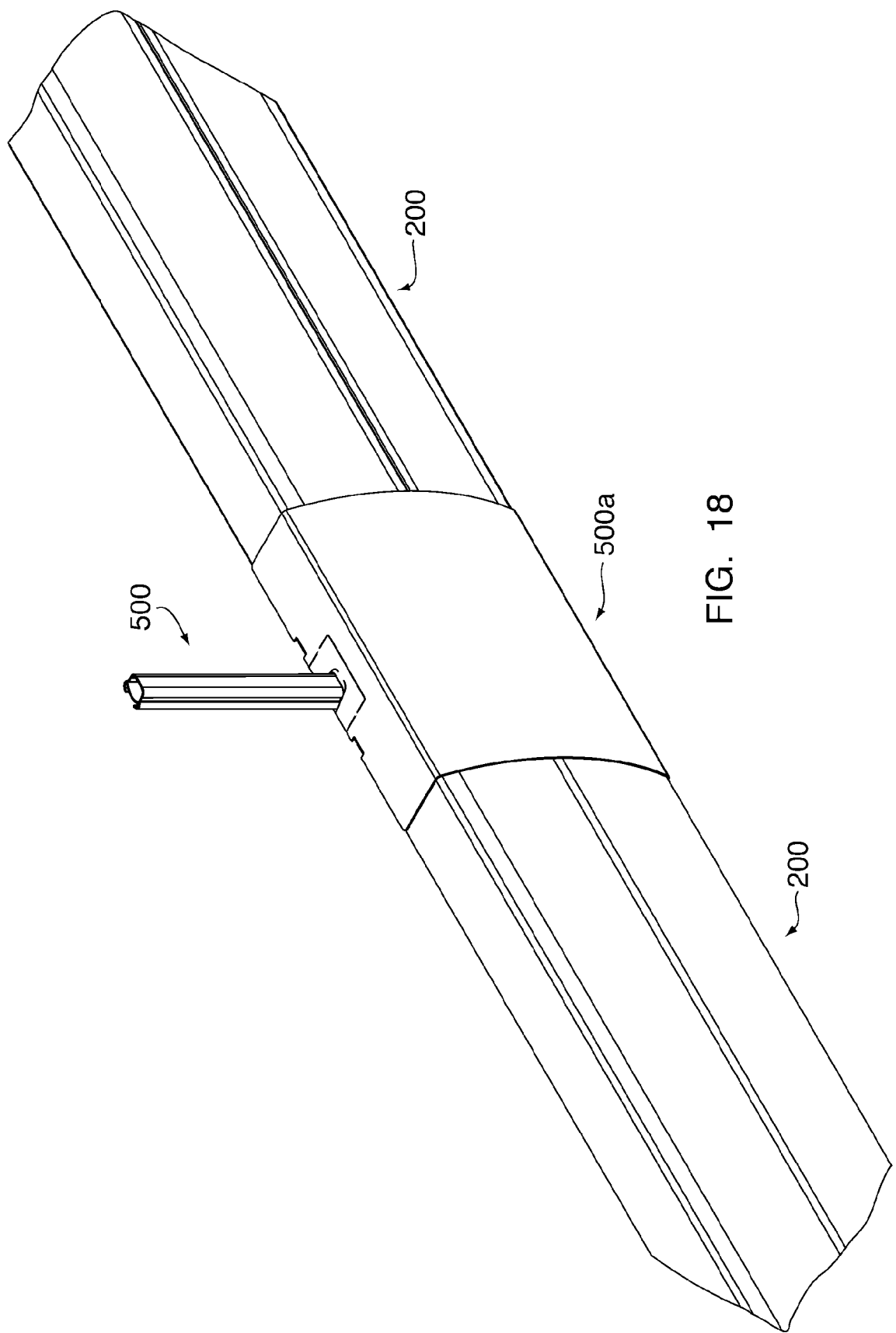
FIG. 18 is a perspective view of two aligned raceway sections 200, 200 that are joined by a transition fitting, and bridging or linking one wireway with another raceway of smaller capacity.

FIG. 18 illustrates raceway assemblies 200, 200 coupled together, but in a way such that a coupler cover 500a also accommodates a T-connection between the upper wireway and a smaller electrical conduit 500 oriented at right angles to the raceway of the present invention. The coupler cover 500a is provided with a knock-out opening to accommodate the conduit 500 and/or a large conduit can also be accommodated by reason of a somewhat larger knock-out opening.

Figure 19:
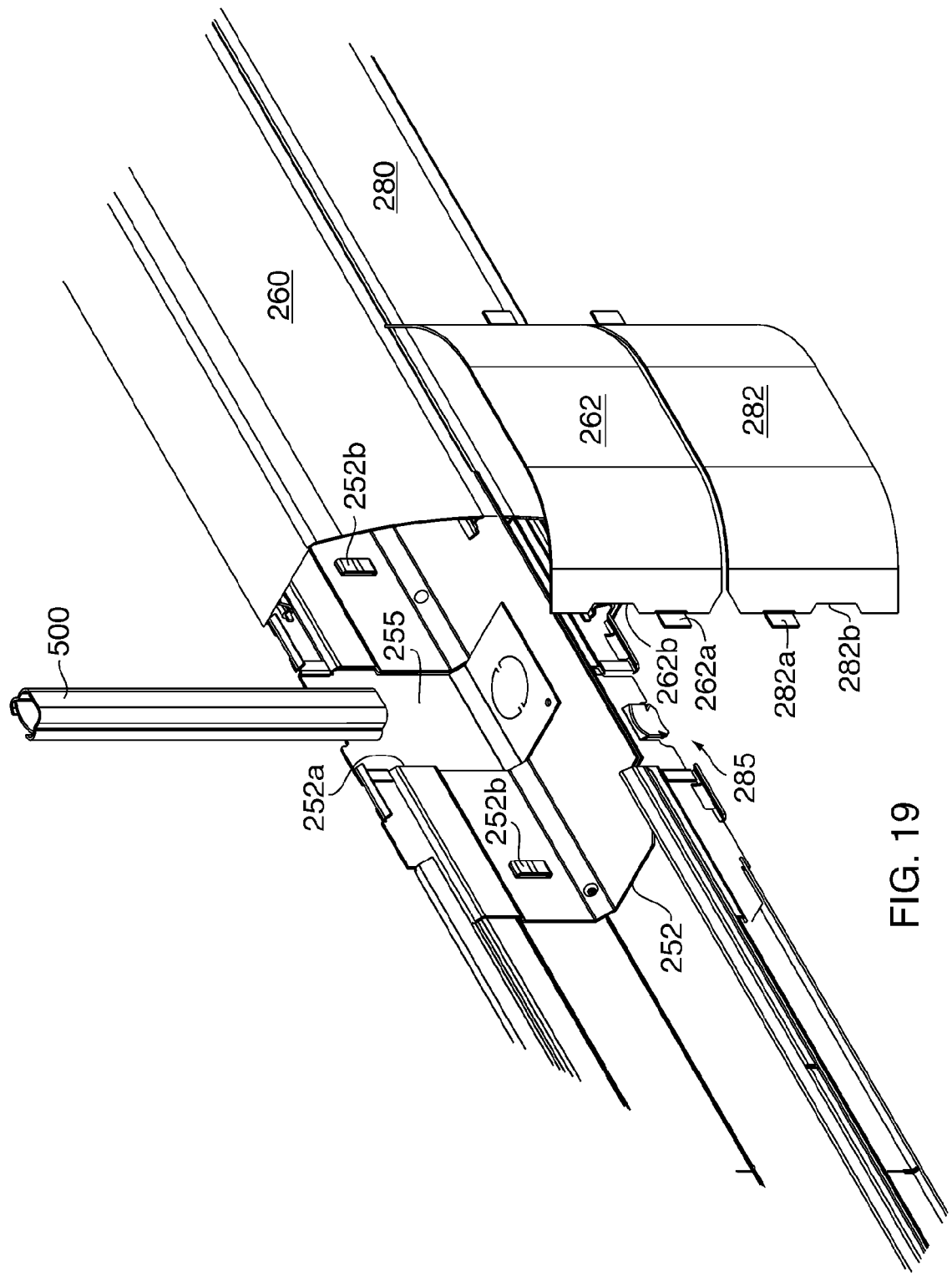
FIG. 19 is an exploded perspective view of some of the assembled components provided between the assembled raceway sections of FIG. 18.

FIG. 19 shows the coupler cover removed, and illustrates a coupling element 252 associated with the upper wireway having a cutout region 252a for receiving a bracket 255 designed to accommodate the conduit 500. As with the previously described couplings 250, 250, coupling element 252 spans the gap between spaced but aligned raceway base components. In accordance with the present invention, cable guides 262 and 282 are provided to afford some protection for the cables or conductors provided in the wireways defined by the T-shaped base and the raceway cover components 260 and 280. The cable guides 262, 282 are configured to allow such cables to pass through the wireways, when assembled with the coupling element 252, but to allow cables within the conduit 500 to run downwardly into the upper wireway, and to be fed in one direction or another of the upper wireway shown in FIG. 19. Tabs 262a on the upper cable guide 262 snap into slots 252b provided for this purpose in the wall of the coupling element 252 for this purpose. Relieved areas 262b allow cables within the conduit 500 to clear the cable guide 262. The lower cable guide 282 may be used to provide an access point in the lower wireway for feeding wires from the wall structure into the lower wireway. A port 285 is provided for this purpose in the lower coupling element as best shown in FIG. 19.

Figure 20:
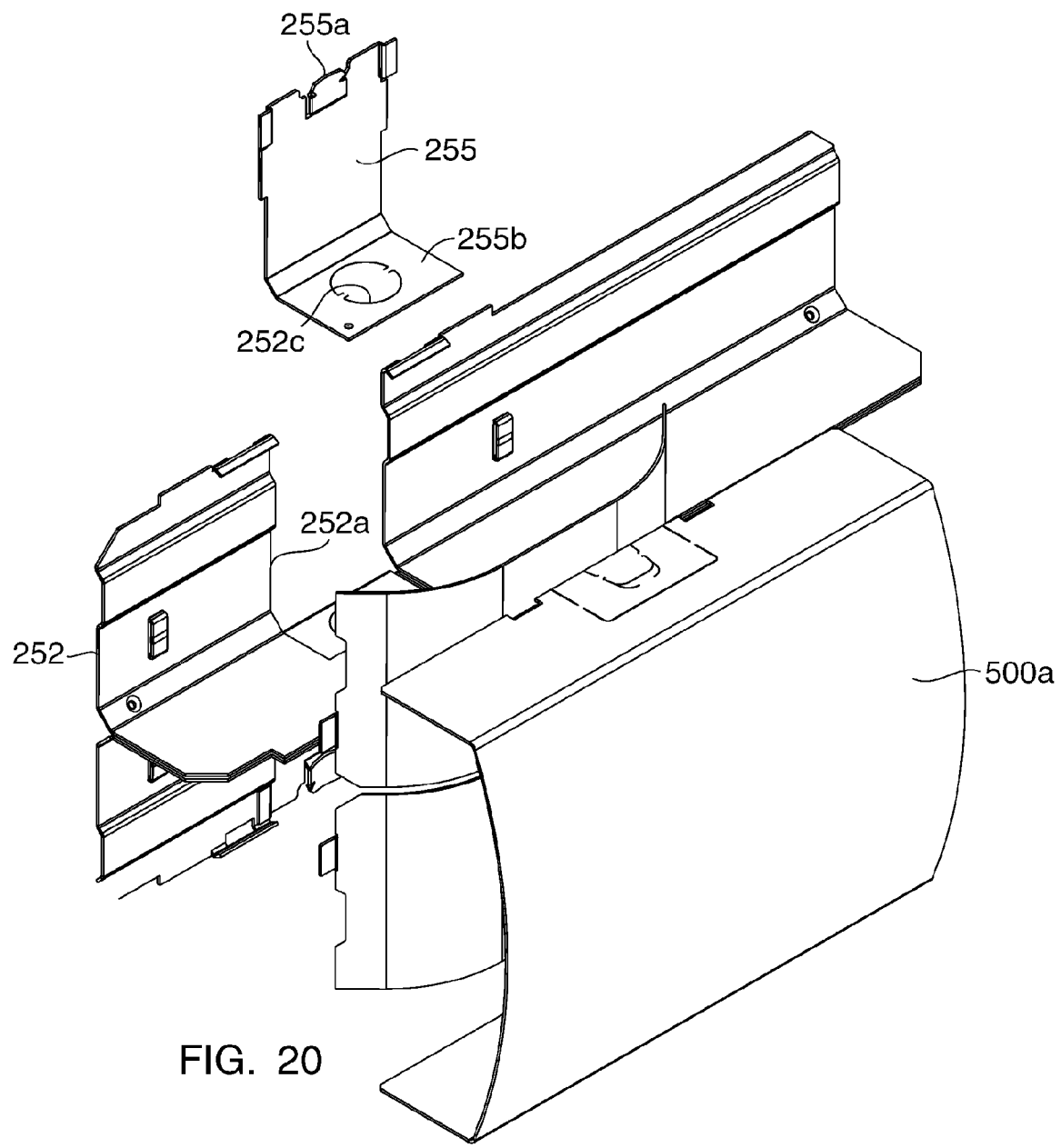
FIG. 20 is an exploded perspective view similar to FIG. 19, but without the raceway sections, which shows the raceway couplers provided in the top and bottom wireways defined by the raceway base plate and the raceway covers.

FIG. 20 is an exploded view showing the upper coupling element 252 having a relieved region 252a for receiving the L-shaped bracket 255 that serves to anchor the conduit 500 by means of tab 255a, and to include a lower portion 255b that defines a knock-out opening for cables run to the lower wireway defined by the raceway assembly of FIG. 19. FIG. 20 also shows the coupling cover 500a together with its knock-out openings in the top wall for receiving conduits such as illustrated at 500, or larger conduit as dictated by the needs of a particular installation.

Figure 21:
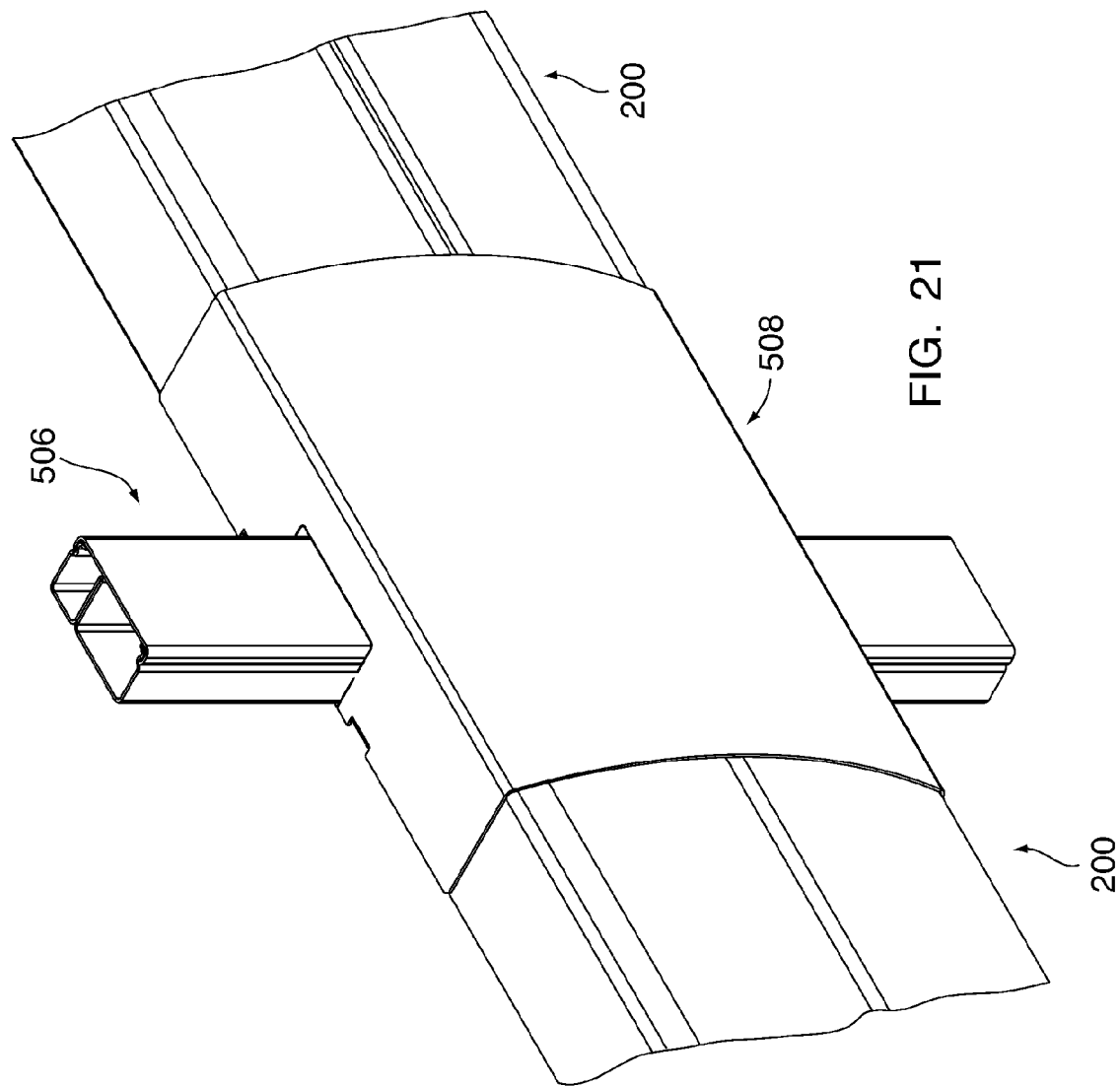
FIG. 21 shows two aligned raceway sections and a transition fitting similar to that shown in FIGS. 18, 19 and 20, but instead of providing access to wiring from and to another raceway 506, the fitting 508 serves to bridge raceway 506 without any cross feeding of cables or wires.

FIG. 21 shows adjacent raceway assemblies of the present invention coupled as described previously to afford a bridge between the wireways defined therein and a crossing raceway or conduit 506. Coupling 508 is provided with knock-out openings in both its top and bottom walls for this purpose.

Figure 22:
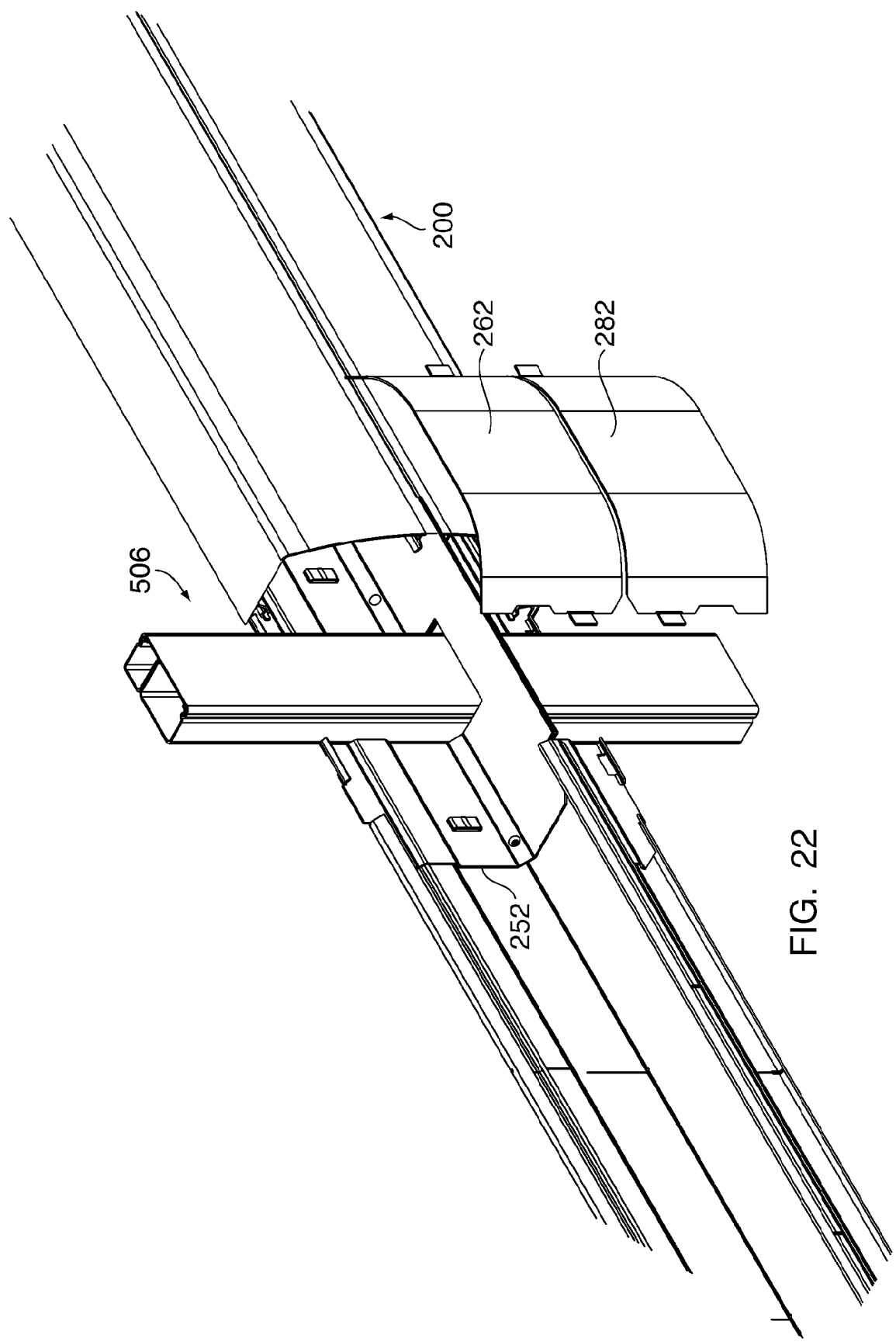
FIG. 22 shows the FIG. 21 assembly, but without the raceway covers in one base plate, and without the transitions fitting cover.

FIG. 22 shows the crossing conduit 506 of FIG. 21 in greater detail, together with the raceway coupling elements 252 required to bridge the gap between the aligned ends of the raceway base components. From FIG. 22 it will be apparent that the L-shaped bracket of the previous views (FIGS. 20 and 21) is not required, and it will further be apparent that the crossing conduit 506 does not feed cables to the wireways defined in the raceway of the present invention. However, cable guides 262 and 282 are utilized in the same manner as described above to facilitate feeding of cables in these upper and lower raceways.

Figure 23:
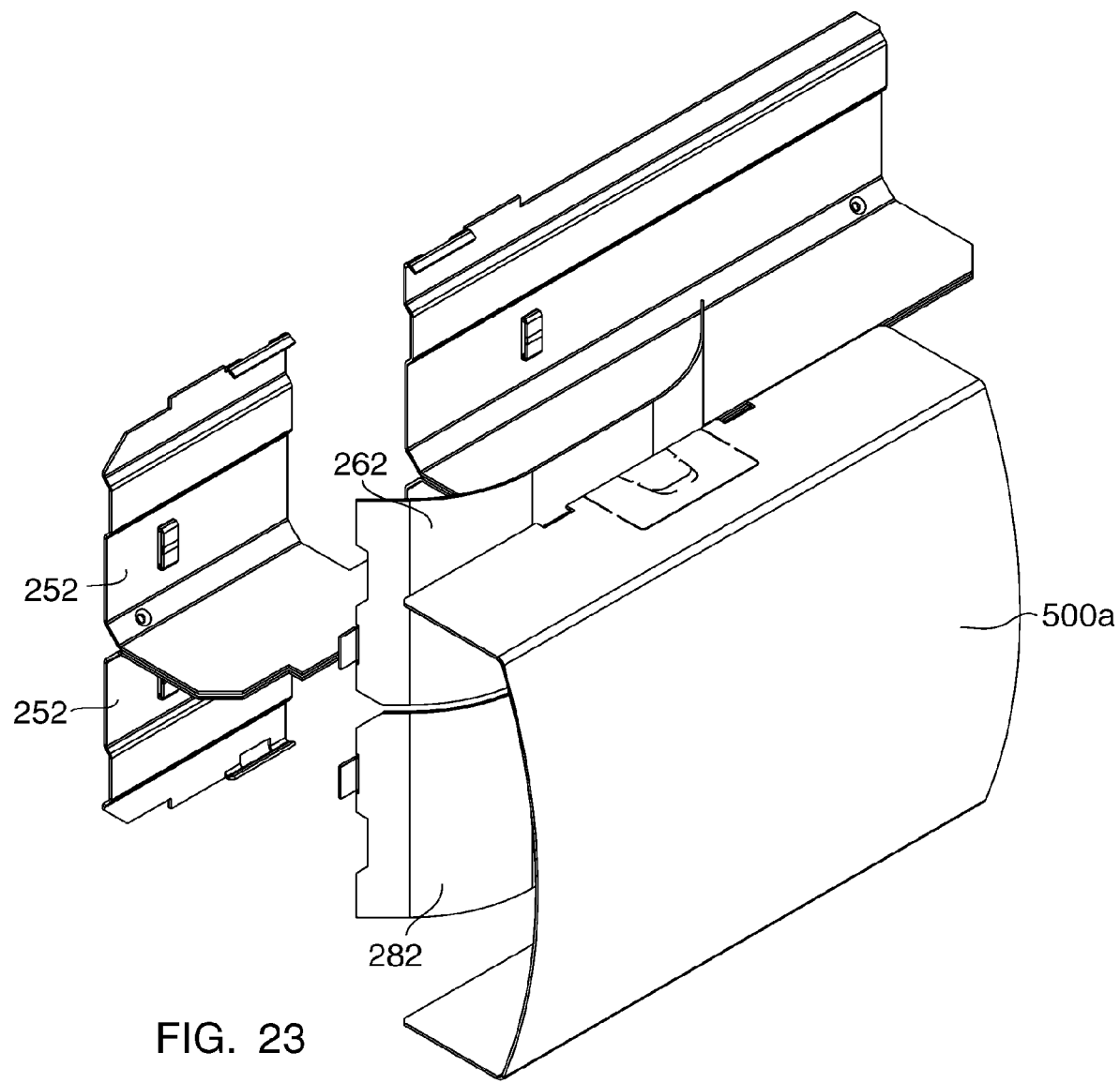
FIG. 23 shows the FIG. 21 assembly, but without the raceway base and covers, to better illustrate the unique coupling means comprising two L-shaped coupling elements arranged alongside one another an coextensively with respect to the spine (not shown) of the raceway base.

FIG. 23 shows the coupling elements 252, 252 associated with the upper and lower wireways of FIGS. 21 and 22, as well as the cable guides 262 and 282, and coupling cover 500a with a knock-out opening pattern similar to that of the coupling cover 500a of FIG. 18.

In FIGS. 24-26 a raceway cover 270 has generally rectangular cutouts 270a for presenting outlet plugs 275 at longitudinally spaced predetermined intervals along the cover. The cover 270 is similar to those described above and has longitudinally extending marginal edges of base plate as shown at the lower edge of base 320. An inner recess 270c forms a pocket to receive the edge 276a of a device bracket 276, also of L-shape, but fits into cover 270 to form a cavity for the outlet device 275. An upper edge 276b of L-shaped device bracket 276 fits into a recess defined at the top inside edge of cover 275a, shown at 270d. The device bracket 276 is of shorter extent than the outlet device 275, as indicated in FIG. 25.

As suggested in FIG. 24, power cables in the lower wireway of the raceway are connected to the terminals of the outlet devices in a conventional manner. These L-shaped covers 270 can be preassembled, as suggested in FIG. 26, for use with selected raceway assemblies of the type described above, for simplifying the task of an installer.

Figure 27:
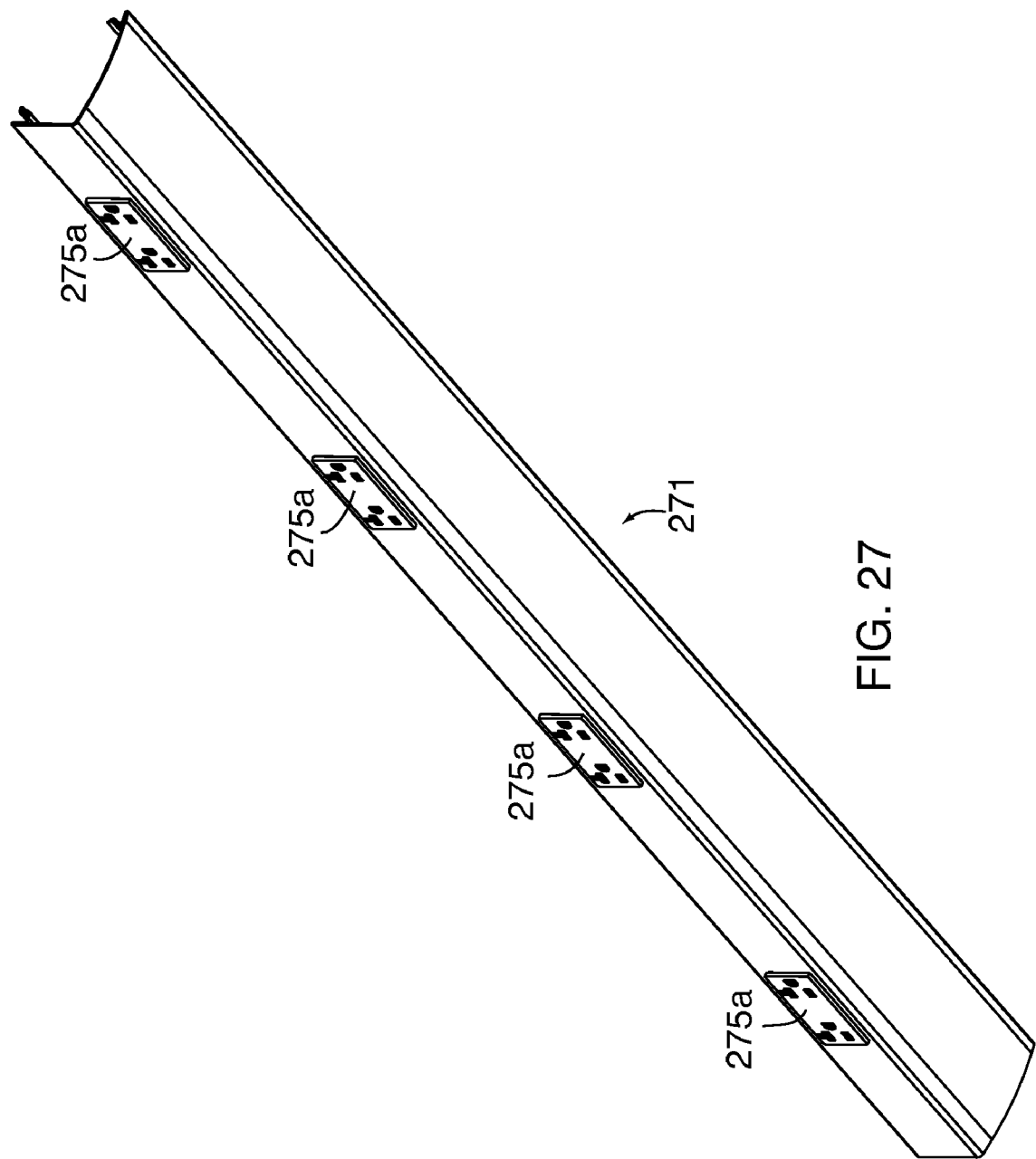
FIG. 27 shows a lower raceway cover component 271 with pre-wired outlets 275a in the lower wall of the cover, rather than in the forward wall as depicted in FIGS. 25 and 26.

FIG. 27 shows outlet devices of the duplex type mounted in the downwardly facing wall of a raceway cover component 271. Data/ communication devices (not shown) of appropriate size might also be mounted in this lower wall of lower raceway cover 271. This is so in spite of the preference for locating the data/ communication cabling in the upper wireway, and the power cables in the lower wireway of a raceway assembly incorporating the present invention. The T-shaped base member preferably has knock-out openings such as shown in FIG. 16a that allow wiring from the upper wireway to pass through the web portion of the T-shaped base for this purpose.

What is claimed is:

1. A raceway system comprising: first and second raceway base plates, said base plates being generally aligned and spaced apart by a gap; first and second raceway covers respectively connected to the first and second base plates; a coupling element overlying and interconnecting the base plates, said coupling element being adjustably received by the base plates for spanning a range of gaps between the base plates, said coupling element having a cutout;
   a coupling cover cooperative with the first and second raceway covers for covering the coupling element, wherein the base plates, raceway covers, coupling element, and coupling cover define at least one wireway; said coupling cover defining knockouts for receiving a perpendicularly oriented obstacle or conduit that extends across the gap between the raceway base plates, and wherein the coupling element cutout and the coupling cover are configured to accommodate the obstacle or conduit in said gap.

2. The raceway system of claim 1, further including:
   a cable guide attached to the coupling element in the wire way for routing electrical cable in the wireway over the perpendicularly oriented obstacle or conduit.

3. The raceway system of claim 2, wherein said knockouts provided in said coupling cover have a shape complementary to that of said obstacle or conduit in said gap between said raceway base plates.

4. The raceway system of claim 3, wherein the coupling element comprises: first and second coupling element base portions defining said cutout, said first and second coupling element base portions overlying and being adjustably received by said first and second base plates, respectively; and a coupling element web defining an overspan across said gap and interconnecting said first and second coupling element base portions, whereby the gap and web overspan are dimensioned to accommodate the obstacle or conduit so that the obstacle extends through the coupling element.

5. The raceway system according to claim 1, wherein:
   said base plates are generally T shaped in cross-section so as to define a central web, and define at least in part, upper and lower wireways for said raceway system; said coupling element being generally L shaped in cross-section with base portions parallel said base plates, said coupling element having a projecting flange oriented generally perpendicular to said base portions thereof, and a second coupling element, said second and first coupling elements defining in part said lower and upper wireways respectively.

* * * * *